US008753428B2

(12) United States Patent
Lomax, Jr. et al.

(10) Patent No.: US 8,753,428 B2
(45) Date of Patent: Jun. 17, 2014

(54) METHOD AND MANIFOLD FOR CARRYING REDUCED MOMENT DUE TO DIMENSIONAL CHANGE IN PRESSURE VESSEL; REMOVABLE INSERT WITH VALVE SEAT; PRESSURE ASSISTED VALVE ARRANGEMENT AND METHOD

(75) Inventors: Franklin D. Lomax, Jr., Hector, NY (US); Howard Abramowitz, Alexandria, VA (US); Edward T. McCullough, Dallas, TX (US)

(73) Assignee: Lummus Technology Inc., Bloomfield, NJ (US)

( * ) Notice: Subject to any disclaimer, the term of this patent is extended or adjusted under 35 U.S.C. 154(b) by 336 days.

(21) Appl. No.: 13/381,581

(22) PCT Filed: Jun. 25, 2010

(86) PCT No.: PCT/US2010/040005
§ 371 (c)(1),
(2), (4) Date: Jun. 11, 2012

(87) PCT Pub. No.: WO2011/002685
PCT Pub. Date: Jan. 6, 2011

(65) Prior Publication Data
US 2012/0247573 A1 Oct. 4, 2012

Related U.S. Application Data
(60) Provisional application No. 61/221,463, filed on Jun. 29, 2009.

(51) Int. Cl.
*B01D 53/047* (2006.01)
*B01D 53/04* (2006.01)

(52) U.S. Cl.
CPC .......... *B01D 53/0407* (2013.01); *B01D 53/047* (2013.01); *B01D 53/0446* (2013.01)
USPC .................................................. 95/96; 96/152

(58) Field of Classification Search
CPC ............. B01D 53/047; B01D 53/0407; B01D 53/0423; B01D 53/0446
USPC ................. 95/96; 96/108, 121, 147, 151, 152
See application file for complete search history.

(56) References Cited

U.S. PATENT DOCUMENTS

| 4,801,308 | A | * | 1/1989 | Keefer | 95/96 |
| 5,984,316 | A | * | 11/1999 | Balsells | 277/553 |
| 6,068,680 | A | * | 5/2000 | Kulish et al. | 95/98 |
| 6,457,485 | B2 | * | 10/2002 | Hill et al. | 137/240 |
| 6,755,895 | B2 | * | 6/2004 | Lomax et al. | 95/97 |
| 6,918,953 | B2 | * | 7/2005 | Lomax et al. | 96/130 |
| 7,763,102 | B2 | * | 7/2010 | Lomax et al. | 96/121 |
| 8,034,164 | B2 | * | 10/2011 | Lomax et al. | 95/121 |

* cited by examiner

*Primary Examiner* — Frank Lawrence, Jr.
(74) *Attorney, Agent, or Firm* — Alix, Yale & Ristas, LLP

(57) ABSTRACT

A pressure swing adsorption system includes a pressure vessel, a nozzle plate coupled to the vessel and sealed with respect to the pressure vessel, a backing plate that supports the nozzle plate, and a manifold including a plenum cavity and coupled to the nozzle plate via a neck such that the plenum cavity is in fluid communication with an interior of the pressure vessel. The neck is sealed with respect to the nozzle plate via a movable sealing surface. A method is provided in which pressure from the plenum cavity assists in closing valve coupled to the manifold. A removable insert is provided to the manifold to provide a removable sealing surface against which the valve closes.

38 Claims, 27 Drawing Sheets

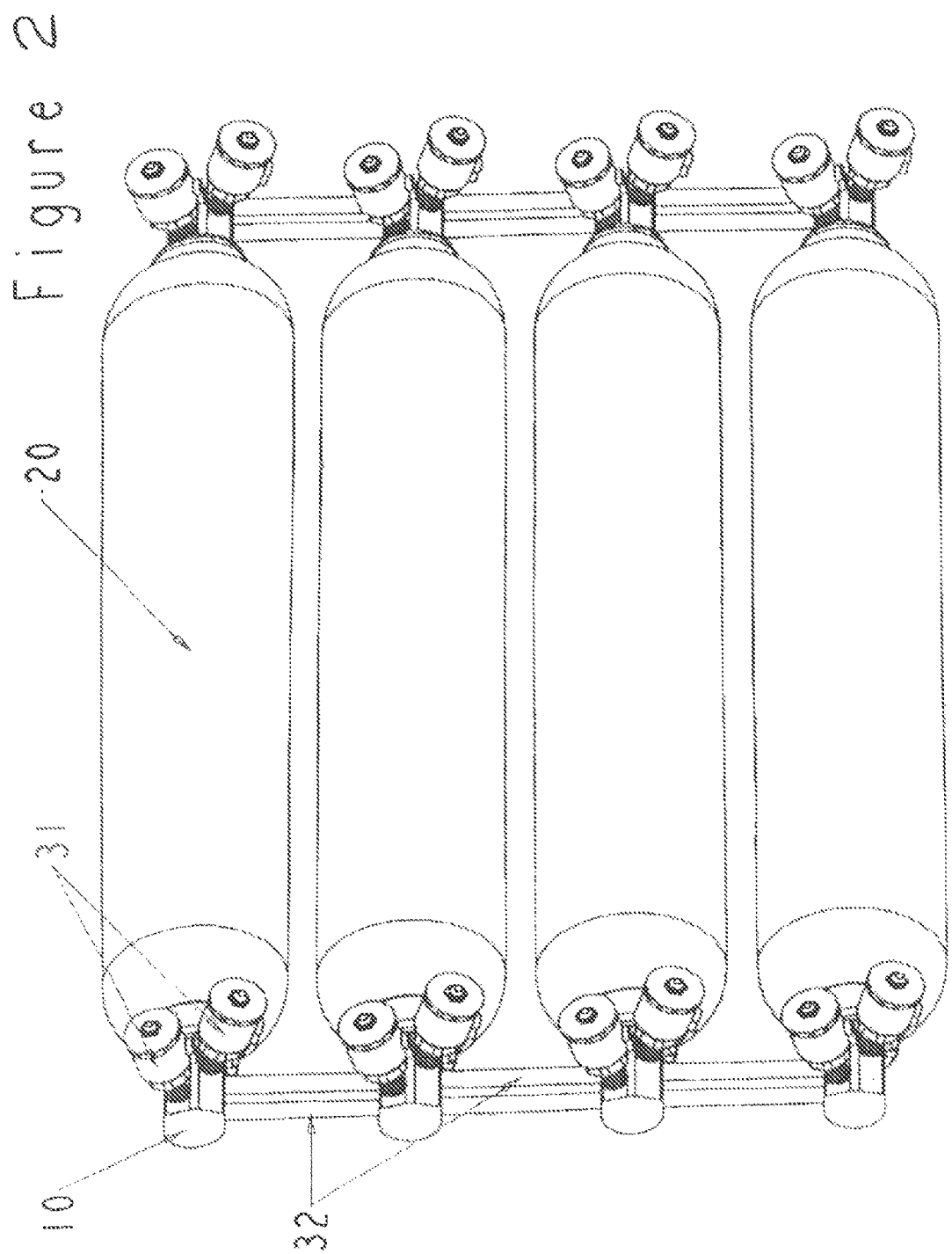

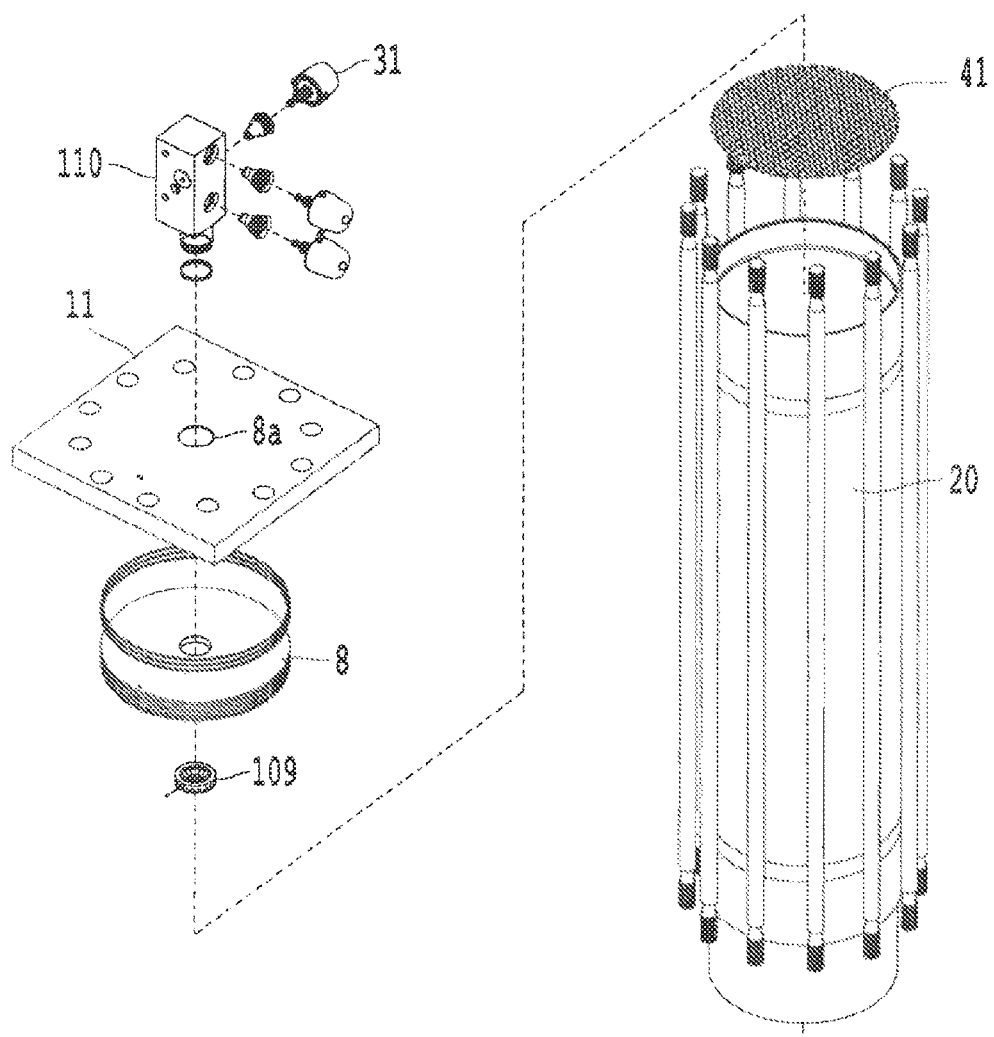
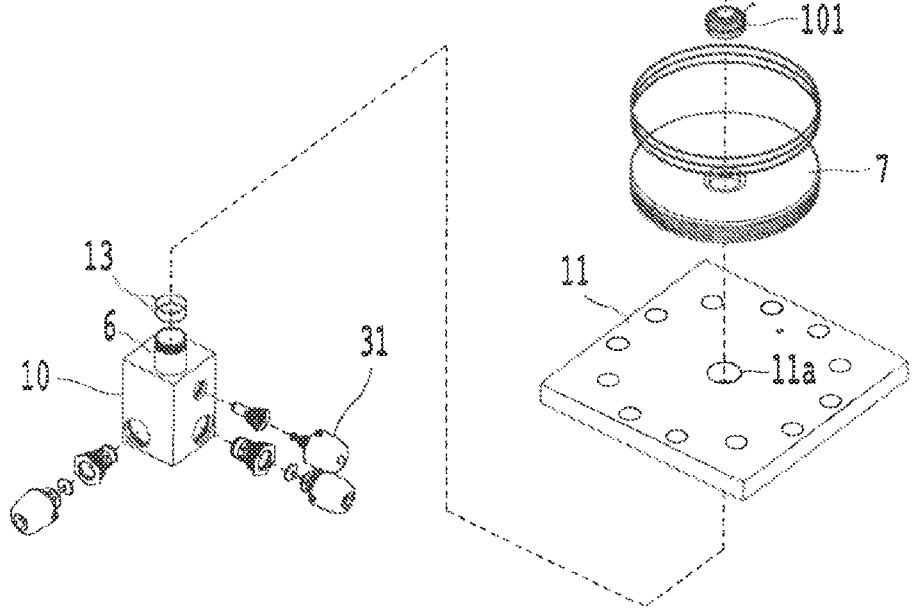
Fig.3A

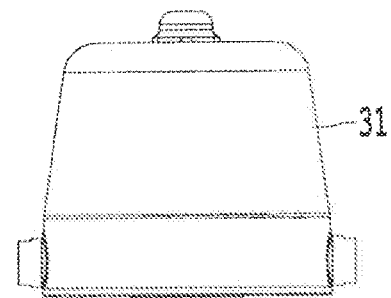
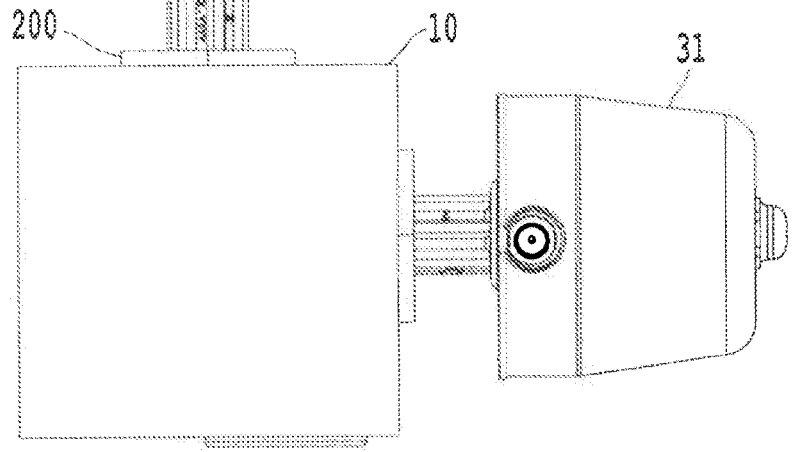
Fig. 8A
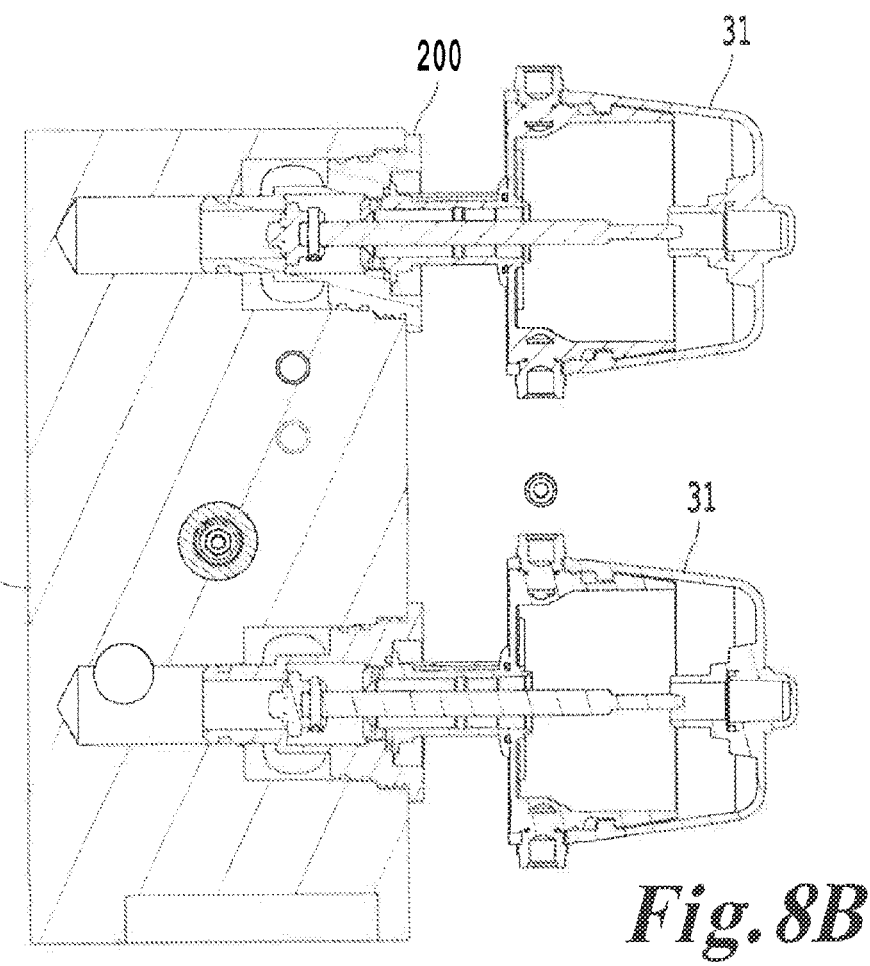
Fig. 8B

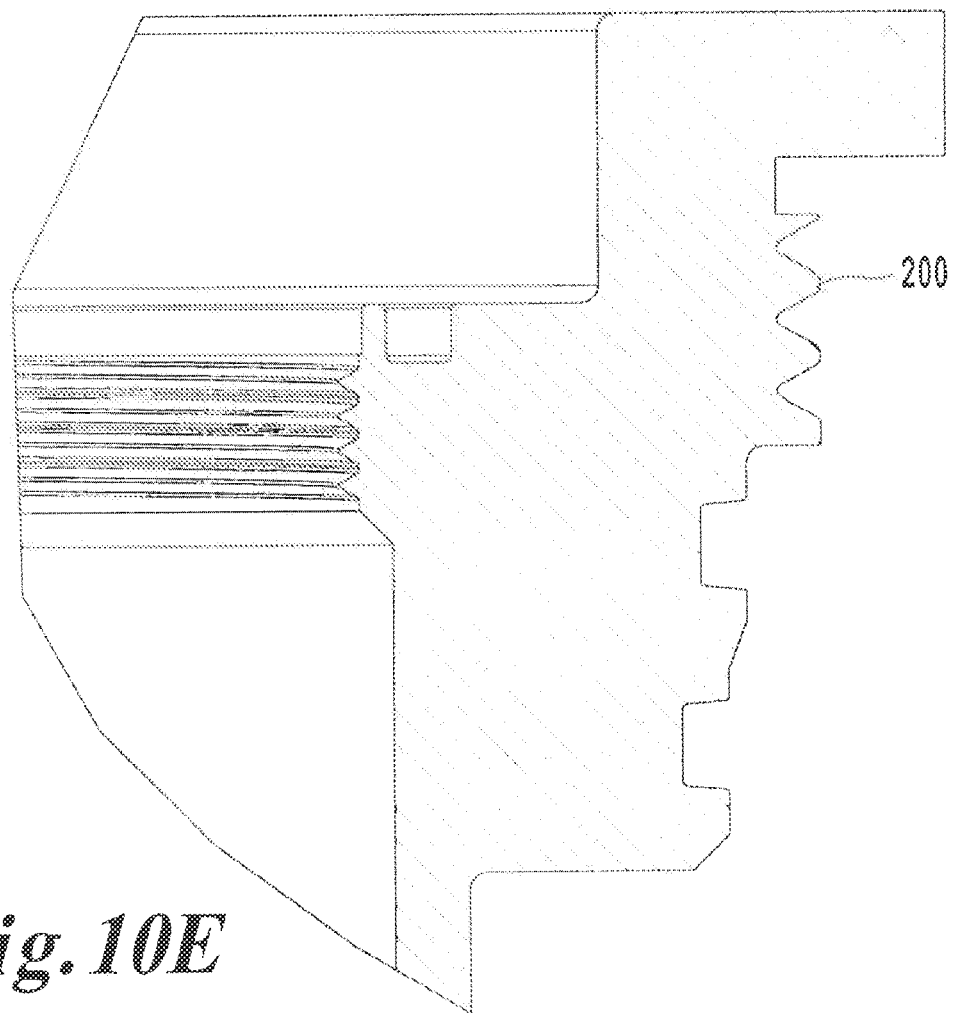
*Fig. 10E*
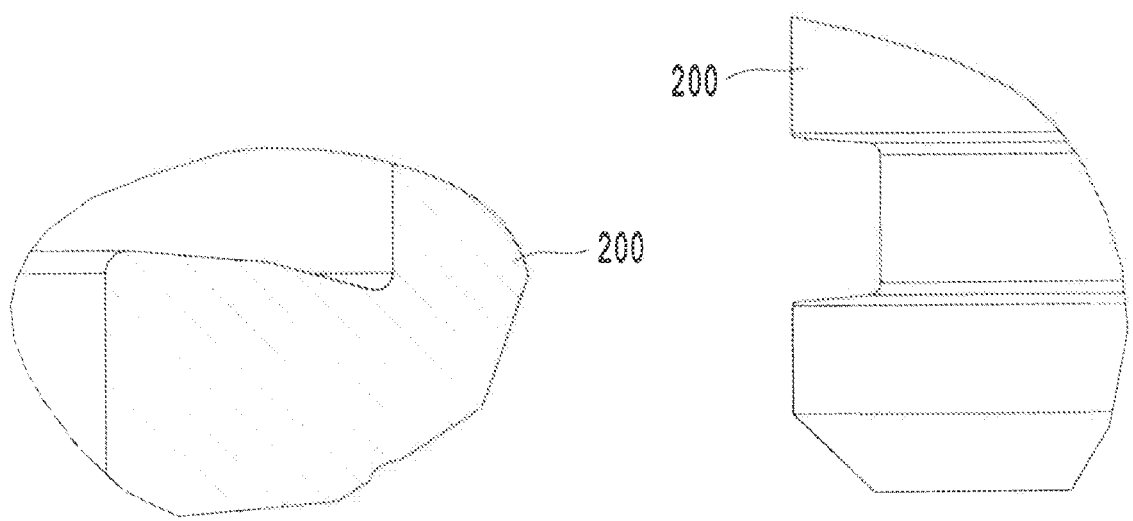
*Fig. 10F*     *Fig. 10G*

METHOD AND MANIFOLD FOR CARRYING REDUCED MOMENT DUE TO DIMENSIONAL CHANGE IN PRESSURE VESSEL; REMOVABLE INSERT WITH VALVE SEAT; PRESSURE ASSISTED VALVE ARRANGEMENT AND METHOD

CROSS-REFERENCE TO RELATED APPLICATIONS

This is the national stage of International Application No. PCT/US2010/04005 filed Jun 25, 2010, which claims the benefit under 35U.S.C. §119(e) of U.S. Provisional Patent Application Ser. No. 61/221,463 filed Jun. 29, 2009.

BACKGROUND OF THE INVENTION

1. Field of the Invention

This invention relates to methods, devices, and systems for making and controlling connections to industrial pressure vessels. In one example, the invention relates to a removable insert for valve manifold that connects to pressure vessel. Another example relates to a valve manifold that applies pressure to a closing portion of a valve so as to assist in closing the valve against a seat. Another example relates to a manifold connection that reduces or prevents dimensional changes in a portion of a pressure vessel or a part connected to a pressure vessel from transmitting force or moment to a nozzle connection. In certain examples, the above-noted arrangements relate to use in pressure swing adsorption (PSA) apparatuses.

2. Description of the Related Art

Early PSA systems generally used four adsorbent vessels operated in parallel. An example of such a PSA system is described in U.S. Pat. No. 3,430,418 to Wagner. Later improvements to Wagner's process added an additional pressure equalization step while retaining four adsorbent beds (see U.S. Pat. No. 3,564,816 to Batta), and subsequently added even more pressure equalization steps to seven or more beds (see U.S. Pat. No. 3,986,849 to Fuderer et al.). These increases in the number of pressure equalizations and the number of adsorbent vessels were implemented to increase the product recovery and the adsorbent productivity. The increases in performance were also typically accompanied by a coincident increase in the number of valves required to operate the systems. For example, the Wagner system utilized at least thirty-one valves, the Batta system utilized at least thirty-three valves, and the Fuderer et al. system utilized at least forty-four valves.

Some PSA systems are often single point of failure systems, with notable exceptions being the processes revealed in U.S. Pat. No. 4,234,322 to De Meyer et al. and U.S. Pat. No. 6,699,307 to Lomax Jr., the entire contents of each of which are incorporated herein by reference. Even in the above-noted processes, the PSA plant is typically shutdown to conduct maintenance on the defective component. Such shutdowns are undesirable as they can cause lost production time for the entire process facility.

A pressure swing adsorption system that can be repaired while in operation was proposed by U.S. Pat. No. 6,918,953, to Lomax Jr et al., the entire content of which is incorporated herein by reference. This system addresses the shutdown concern by implementing PSA modules which provide redundant operation allowing for single modules to be taken offline for maintenance without taking the entire PSA system offline. Each module includes a top and bottom manifold that contains internal flow passages for communication between the feed, product, raffinate, and equalization flow between each vessel in the manifold. One example of another PSA module is described in U.S. Pat. No. 6,755,895 to Lomax Jr. et al., the entire contents of which are hereby incorporated by reference.

While the modular PSA design reduces the single point of failure nature of the conventional PSA design, it still has a large number of moving parts which may require maintenance.

PSA valves typically cycle frequently, and as a result, these valves may incur wear which can potentially lead to a leak in a valve. Internal leaks occur when the seat or valve member (also referred to as the disc) is damaged resulting in a pathway for gas to flow between the two. This can affect the purity of the PSA separation thus any leaking valve needs to be repaired quickly.

As shown in FIG. 12, a conventional pressure swing absorption apparatus is shown with a pressure vessel and a manifold connected to the pressure vessel. The manifold is connected to the pressure vessel via a rigid connection. In this background figure, the rigid connection is via threading on a neck that protrudes from a bottom plate connected to the pressure vessel. The neck places a plenum cavity in the valve manifold in fluid communication with a nozzle disposed within the pressure vessel. Thus, gas flowing from the adsorptive material can pass into the plenum cavity via the nozzle, and gas within the plenum cavity can pass within the pressure vessel in order to contact the adsorptive material inside. Passages connect the plenum cavity to channels. The passages can be opened or closed via valves disposed in ports in the valve manifold. The above-noted arrangement provides certain benefits inasmuch as the valve manifold reduces the total number of plumbing connections that have to be made in order to correctly plumb a pressure swing absorption system. This reduction in plumbing reduces the weight of the system, reduces the cost of the system, and increases the reliability of the system.

However, certain disadvantages occur with the system described in FIG. 12. For example, the rigid connection between the pressure vessel and the valve manifold can result in transfer of stress from the pressure vessel to the valve manifold when the pressure vessel is pressurized. In other words, when the pressure vessel is pressurized, the plate, and therefore the neck on the bottom of the plate, will tend to displace in a direction toward the valve manifold. In some cases, the displacement can be as much as 0.20 inches. This displacement can cause stress to connections made to the valve manifold. In certain cases, leaks or cracks may occur in the plumbing connected to the valve manifold as a result of the displacement caused by the pressure inside the pressure vessel.

Additionally, as shown in FIG. 12, the valves are connected directly to the valve manifold, and the seal of the valve, for example, a gasket, will seat on a valve seat disposed on the valve manifold itself. One potential problem with the above-noted arrangement is that the valve seat, which is part of the valve manifold, is difficult to rework or service if it should become scratched or otherwise marred. In some cases, if the valve seat is extensively damaged, the entire valve manifold will have to be replaced merely because the valve seat leaks.

Another potential disadvantage to the system described in FIG. 12 is that the valves are preferably biased to a normally closed position. In other words, absent other factors, the valves will default to seal the passage between the plenum cavity and the channels. This preference is due in part to safety concerns. In some instances, the pressure inside the plenum cavity is higher than the pressure inside the channels.

For many valve manifolds, the bias in the valves is created by a biasing device such as a spring. When the overall open area of the passage is relatively small, the surface area of the seal assembly portion of the valve exposed to pressure is also relatively small, and the biasing mechanism, e.g., spring, is sufficiently strong to overcome the pressure applied to the bottom of the valve. In this case the valve will remain closed due to the biasing force produced by the biasing device. However, in sufficiently large valve manifolds, the passages become so large that it is difficult or prohibitively complicated to provide a biasing mechanism that will maintain the valve in a closed state when the pressure inside the plenum cavity is larger than the pressure inside the channel.

SUMMARY OF THE INVENTION

One aspect of the present invention provides an insertable valve seat assembly, i.e., an "insert," that can be used in a PSA valve manifold to simplify valve repair and replacement.

In one aspect of invention, PSA product, equalization, and purge flow control valves are integral to a manifold at the top of each PSA vessel. The feed gas and waste gas flow control valves are integral to a manifold at the bottom of each PSA vessel.

The insert typically includes the valve seat, thus if the valve seat is damaged, the valve seat can be quickly removed and replaced, minimizing down time of the module containing the damaged valve. Additionally, the insert contains a means to connect the valve bonnet to the insert in a manner that allows the valve body to be easily removed to repair the disc or to replace the entire valve body. In a preferred embodiment the valve body is threaded into the insert. In a preferred embodiment a piston valve is used, however a globe, needle or other valve type could be used.

The insert is attached directly to the valve manifold by any conventional means creating an easily removable seal to atmosphere. In a preferred embodiment the insert is threaded into the manifold and the seal to atmosphere is made by a radial O-ring seal, cup seal, lip seal or other radial seals. In another preferred embodiment, the use of a two O-rings to create a radial seal is used to limit leakage. The use of more O-rings or the use of a vent or purge at less than process pressure or greater than process pressure between O-rings is also sometimes performed to increase the seal quality and reduce the risk of leaking process gas to atmosphere. The ports in the manifold are separated by any conventional means that allow the insert to be removed. In a preferred embodiment the separation is made by a radial O-ring seal.

In one embodiment when the valve is closed the process gas is on top of the disc and acts to press the disc into the seat and create a better seal. This is achieved by perforating the length of the insert between the valve seat and the bonnet connection. The perforations may be shaped as round holes, as slots, or expanded mesh. Certain examples of perforations for flow control are depicted in U.S. patent application Ser. No. 11/330,084 to Lomax Jr. et al., the entire contents of which are herein incorporated by reference in their entirety. When the valve is actuated, the disc lifts above the seat allowing fluid communication between the plenum and the channel through the passage and the perforations. The size, shape and quantity of the holes can be controlled to influence the flow rate through the valve ports. This is helpful in the equalization and purge flow paths as a controlled flow rate is desirable to prevent fluidization of the PSA adsorbent bed. Feed, product and waste gas restrictions to the flow can negatively affect PSA performance and reduce the recovery of product gas.

One aspect of the present invention is to provide a method and arrangement of connecting a valve manifold to a pressure vessel such that the valve manifold is at least partially isolated from mechanical displacement of the pressure vessel.

Another aspect of the invention is to provide a valve manifold arrangement where the valve seat in the valve manifold is replaceable, for example, with an insert including the valve seat and that is received within the valve manifold.

Another aspect of the invention provides an arrangement within the valve manifold where the pressure inside the plenum cavity assists in seating the disk against the valve seat. In other words, the pressure inside the plenum cavity provides a force tending to push the disc of the valve toward the valve seat rather than away from the valve seat.

One aspect of the invention provides a pressure swing adsorption system including a pressure vessel, a nozzle plate coupled to the vessel and sealed with respect to the pressure vessel, a backing plate that supports the nozzle plate, and a manifold including a plenum cavity and coupled to the nozzle plate via a neck such that the plenum cavity is in fluid communication with an interior of the pressure vessel. This aspect of the invention provides that the neck is sealed with respect to the nozzle plate via a movable sealing surface.

Another aspect of the invention provides a pressure swing adsorption system including a pressure vessel and a nozzle plate coupled to the vessel and sealed with respect to the pressure vessel. This aspect includes a backing plate that supports the nozzle plate and a manifold including a plenum cavity coupled to the nozzle plate via a neck such that the plenum cavity is in fluid communication with an interior of the pressure vessel. The manifold includes at least one valve configured to open and close a passage in the manifold such that the plenum cavity is in fluid communication with, and blocked from fluid communication with, respectively, a channel in the manifold. A removable insert couples the valve to the manifold and includes a first surface configured to abut a movable second surface disposed on the valve.

Another aspect of the invention provides a method of performing pressure swing adsorption. This method includes providing a pressure vessel and a valve manifold. The valve manifold includes at least one plenum cavity connected, in fluid communication, to an opening of the vessel such that the plenum cavity is in fluid communication with an interior of the vessel. The valve manifold also includes a channel and a passage connecting, in fluid communication, the channel to the cavity. The method includes connecting a valve to the passage. The valve is configured to selectively permit and restrict flow between the channel and the cavity via the passage. A valve includes a first surface and a second surface opposite the first surface such that, when the valve restricts flow between the channel and the cavity, the first surface is disposed in direct contact with a seating surface disposed inside the valve manifold. The method includes urging the first surface toward the seating surface by applying a pressure to the plenum cavity greater than a pressure applied to the channel.

BRIEF DESCRIPTION OF THE DRAWINGS

These and other advantages of the invention will become more apparent and more readily appreciated from the following detailed description of the exemplary embodiments of the invention taken in conjunction with the accompanying drawings where:

FIG. 2 depicts a PSA system including four vessels;

FIGS. 3A-3C depict a vessel in exploded view, a manifold shown in detail, and an isometric view of an assembled vessel, respectively;

FIG. 8A is a side view of another example of a manifold;

FIGS. 8B-8D are section views of the manifold shown in FIG. 8A;

FIGS. 10A-10G are corresponding views of another embodiment of an insert according to the present invention, the views correspond to those shown in FIGS. 9A-9G with respect to the earlier embodiment of the insert;

DETAILED DESCRIPTION OF THE PREFERRED EMBODIMENTS

Figure 1A:
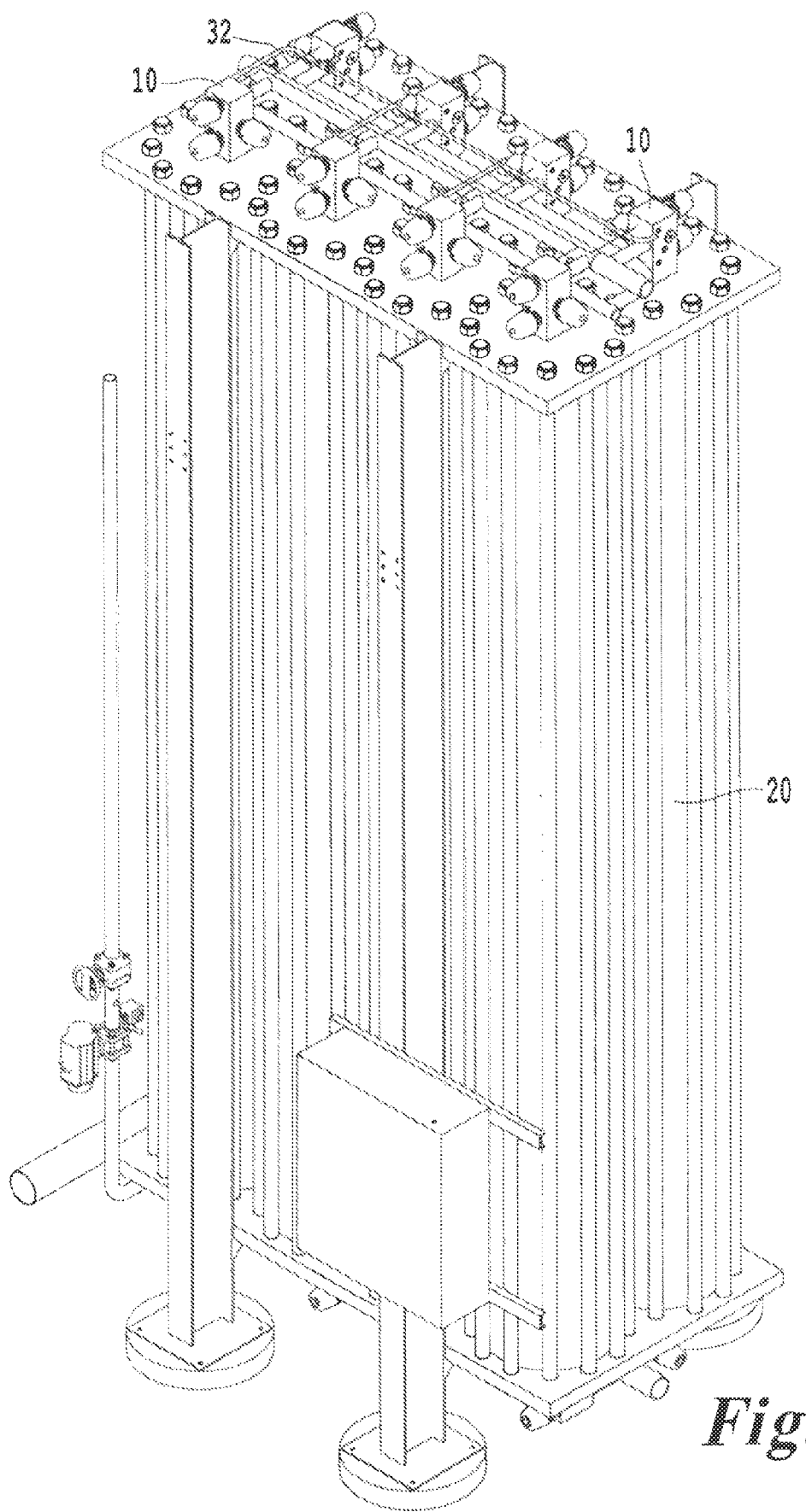
FIGS. 1A-1B depict various views of an example of a PSA system including eight vessels.
Figure 1B:
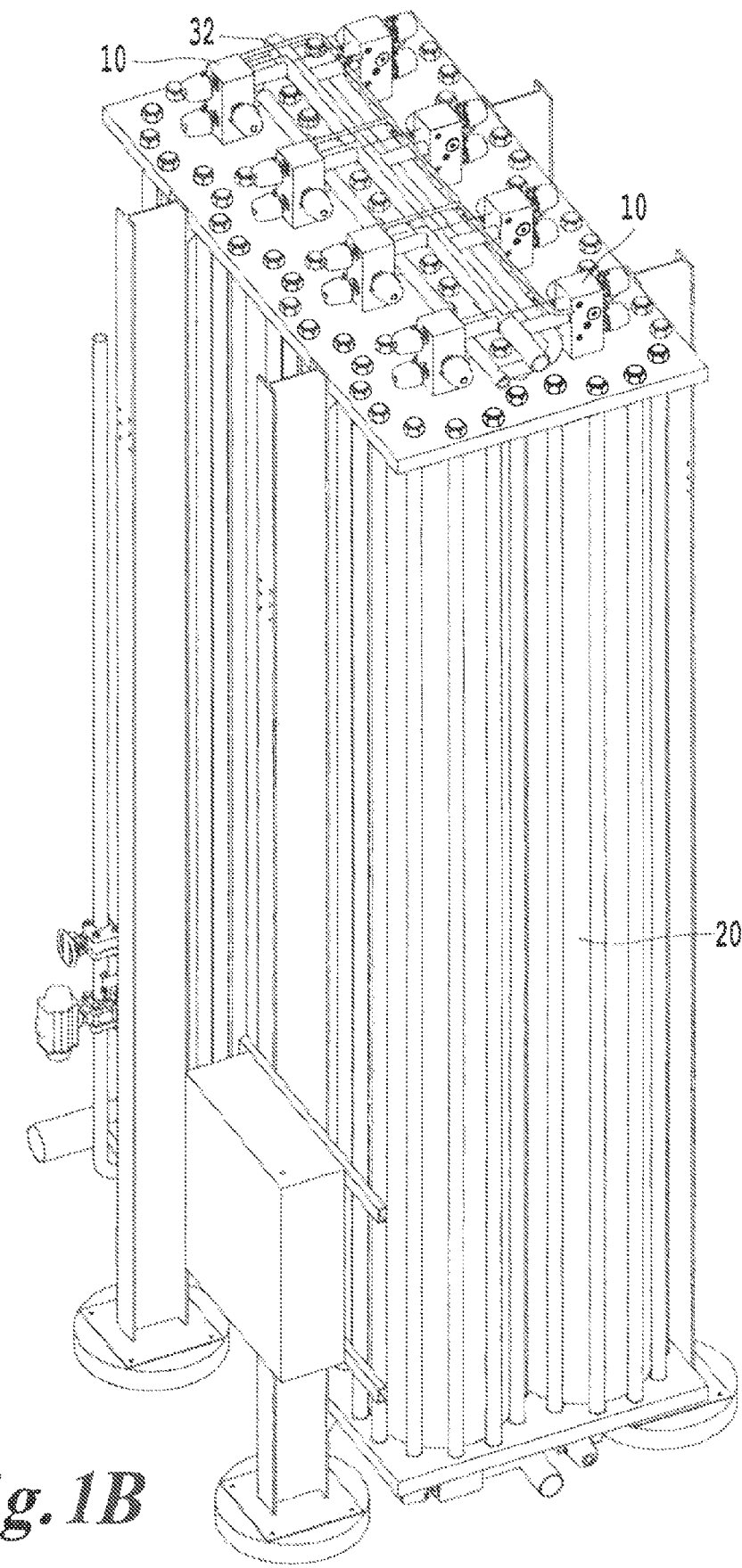

FIGS. 1A-1B depict various views of a PSA system including four vessels on each side (a total of eight). As shown in FIG. 1B, the various vessels each include a manifold 10 connected via fluid connectors 32. The vessels 20 typically include a manifold 10 on top and on bottom. The manifolds 10 can be identical or differently ported, depending on the use of the PSA system.

FIG. 2 depicts four adsorbent vessels 20 forming a PSA system. In FIG. 3, each valve manifold 10 is provided with two valves 31. However, arrangements with three, four, or more valves may be used. The valve manifold may be manufactured by machining, casting, forging, or powdered metallurgy, for example. Typical materials for the manifold 10 are carbon steel or stainless steel, but other materials may be used. Each fluid channel can communicate with every other vessel via fluid connectors 32. The fluid connectors 32 can be rigid pipes as shown here, or may be compliant, flexible tubing. Further, the fluid connectors can be joined to the manifolds 10 either permanently, or via removable connectors. In other words, in some embodiments, the fluid connectors 32 are solid assemblies with the manifolds 10 integrally connected with each other.

It can be appreciated by reviewing the figures that each fluid channel, combined with the fluid connectors 32, forms a continuous fluid pathway between the valves and plenums of each adsorbent vessel. Thus, any cycle which contemplates fluid exchange between vessels operating at different points in the PSA cycle may be implemented with the manifolds. If it is so desired, the manifolds may be integrated into one or more larger manifolds which communicate with two or more individual adsorbent vessels. Such an integrated manifold may reduce or eliminate the use of fluid connectors 32. The integrated manifolds are typically manufactured by casting, molding, machining and/or other techniques and combinations of techniques. Because the dimensions of the integrated manifolds are related to the size of the adsorbent vessels, the preferred manifestation of the manifolds depends upon the detailed feasibility and economics of each system. Thus, independent manifolds may be preferred for systems of relatively large vessel diameter, whereas integrated manifolds communicating with two or more vessels may be preferred for vessels of small diameter.

As discussed above, PSA systems may use integral manifolds and vessels, all of which may alternatively be formed in a single component, or in many components, where the independent valve elements communicate with the adsorbent vessels in such a way to implement virtually any PSA cycle which contemplates parallel connection between vessels for exchange of fluid during different phases of the PSA cycle. Although FIG. 2 illustrates piston valves with pneumatic actuation, other types of valves are usable. The valves may be actuated pneumatically, electromagnetically, hydraulically, or via mechanical drive by camshafts, gear trains, or other means. Direct mechanical actuation may be preferred in small systems with integral manifolds communicating with many adsorbent vessels; as such systems lend themselves to the close mechanical tolerances required for successful operation via mechanical drive. Valves where the axis of motion is parallel to the valve port are preferred. Valves where the axis of motion is concentric with both the valve port and the valve seat are especially preferred.

Figure 3B:
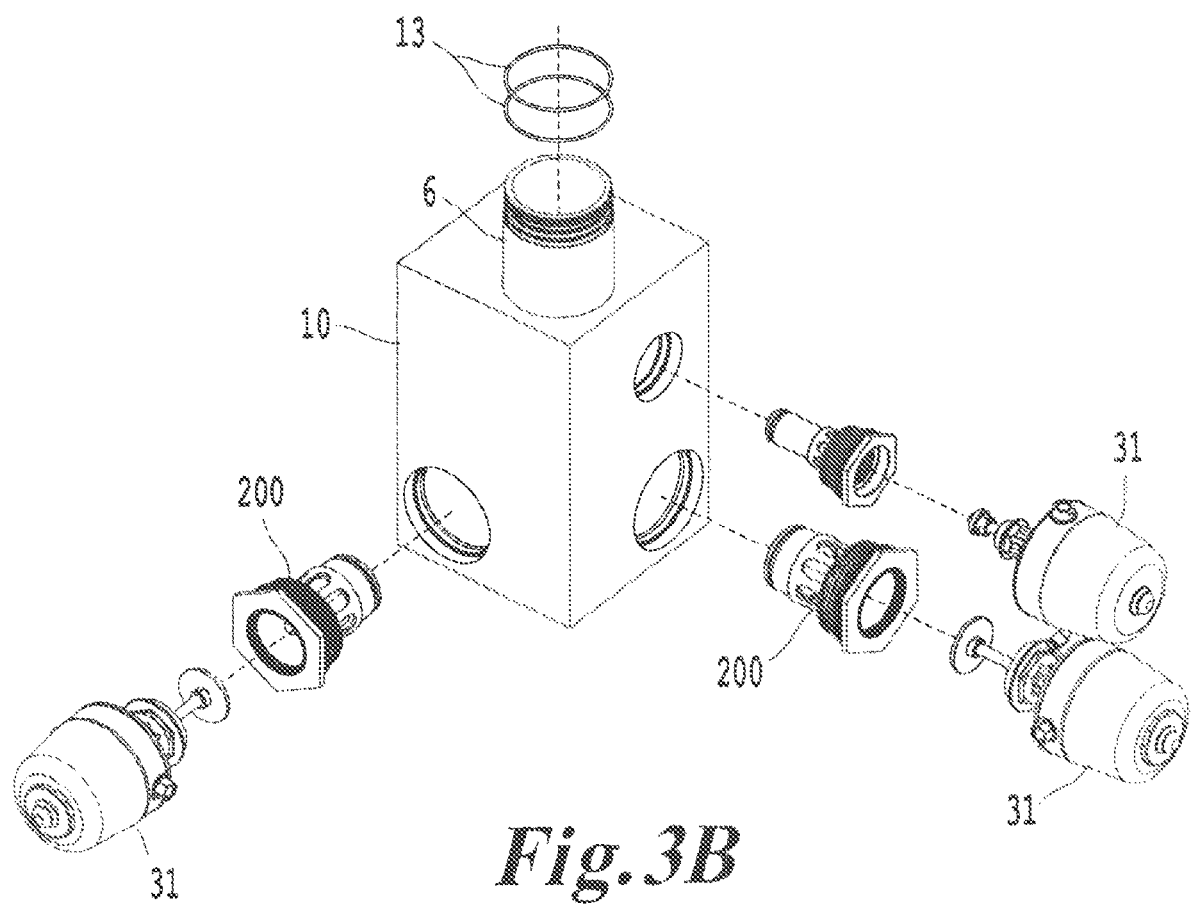
Figure 3C:
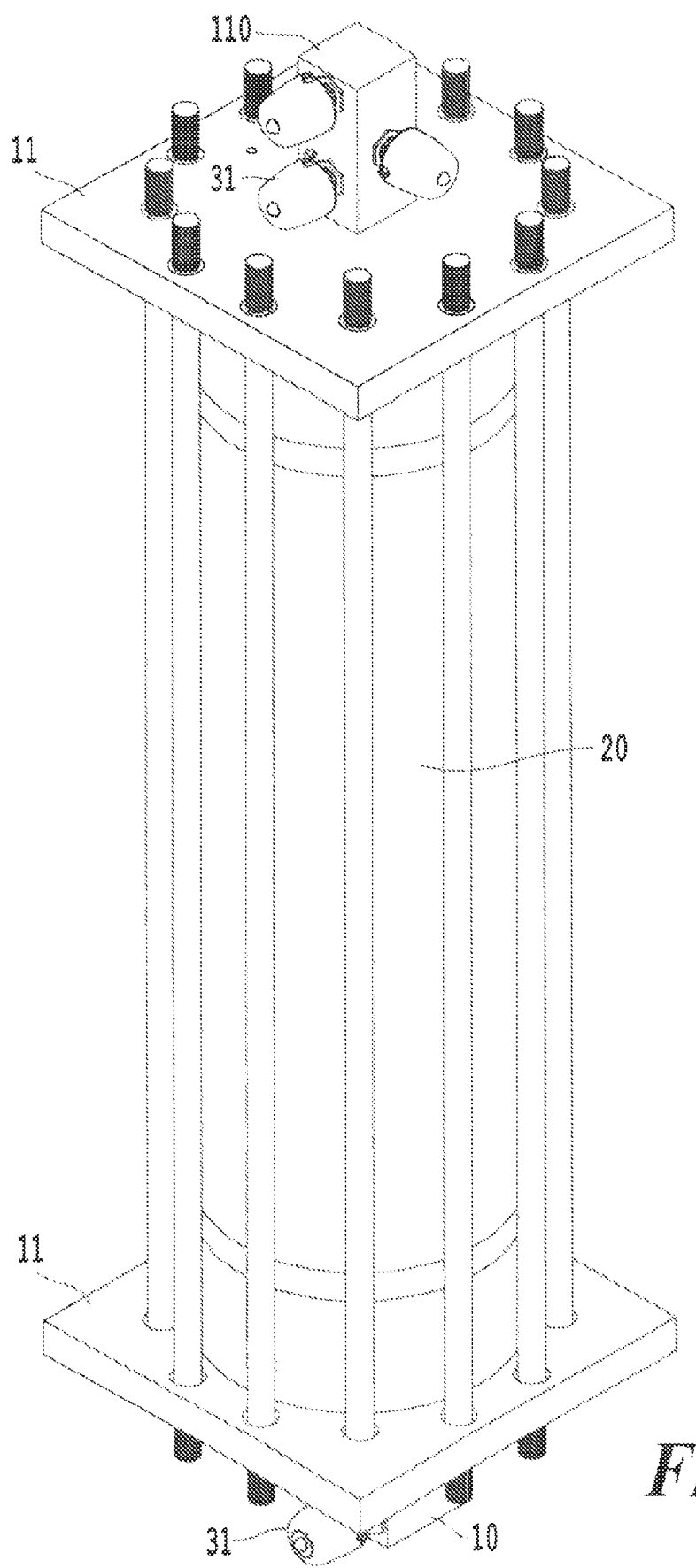

FIG. 3A depicts an exploded view of a vessel 20. As shown in FIG. 3A, the valve manifold 10 includes a neck 6, which holds O-rings 13. The neck 6 passes through the backing plate 11 via a hole 11A. The neck 6 also passes through a diffuser nozzle 7, which in FIG. 3A is depicted as a dished plate. The diffuser nozzle 7 typically supports housing O-rings 14, which can be one or more in number. The housing O-rings 14 form a seal between an outside diameter of the diffuser nozzle and the inside diameter of the vessel 10. The neck 6 is typically captured by the sparger 101. In some examples, the sparger 101 is affixed to the neck 6 via threading. For example, the sparger 101 can act as a nut where the neck 6 acts as a threaded bolt. Above the sparger 101 is disposed a perforated plate 41. The perforated plate 41 typically supports an adsorptive material disposed within the vessel 20. The perforations in the plate 41 allow gas to pass gas from the sparger 101 into the adsorptive material. A similar arrangement is set forth on the top portion of the vessel 20 where a perforated plate 41 is placed below a second sparger 109. The second sparger 109 is connected to a stem or second neck 5, which passes through a hole 8A in the upper diffuser nozzle 8. The stem 5 connects to the upper manifold 110. The upper manifold 110, as discussed above, can be identical or can have a different arrangement from the manifold 10 disposed on the bottom of the vessel 20. As shown in FIG. 3B, the manifold 10 can receive one or more valves 31. As further shown in FIG. 3B, the neck 6 is attached to the manifold 10, increasing or decreasing the size of the gap. This attachment can be made via threaded connection, welding, adhesive, or other methods, but must be made with a good seal formed between the neck 6 and manifold 10.

Figure 4:
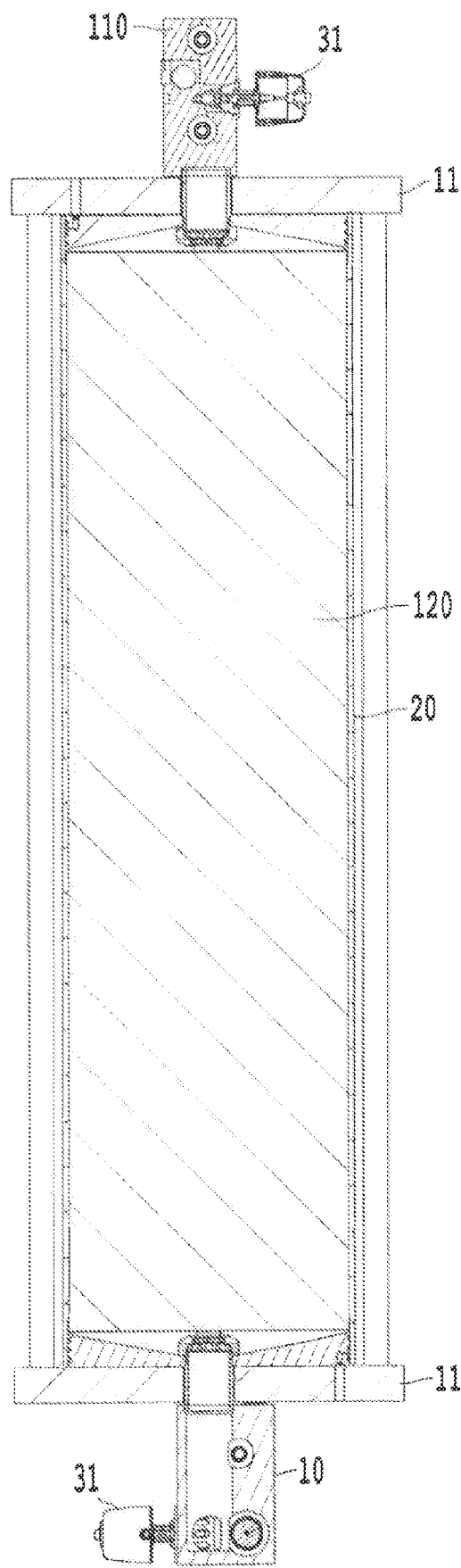
FIG. 4 is a section view of a PSA vessel with manifolds attached to top and bottom portions of the PSA vessel.
Figure 5A:
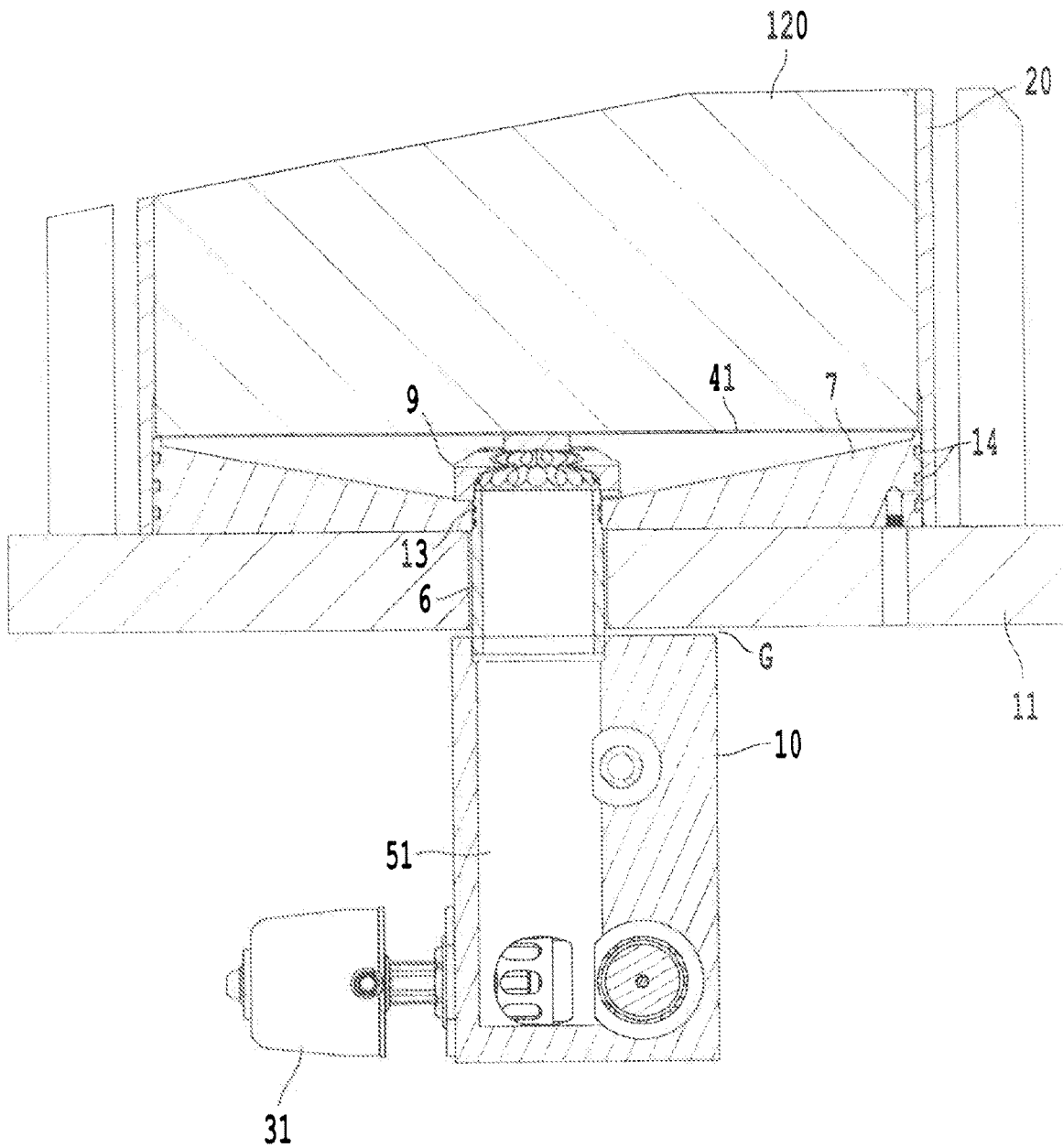
FIG. 5A is a detailed section view of a bottom portion of a PSA vessel with a manifold attached.

As shown in FIG. 4, the manifold 10 controls the flow of gas into the vessel 20. As best shown in FIG. 5A, a gap G is typically disposed between the backing plate 11 and the manifold 10. The gap G allows for movement of the backing plate 11 relative to the manifold 10. Typically, the manifold 10 is connected to other manifolds, and therefore, if the connection between the manifold 10 and other manifolds disposed on other vessels 20 is a rigid connection, then movement of the backing plate 11 can cause stress in the rigid connection between the manifolds if the manifold 10 is force to move in concert with the backing plate 11. Thus, the gap G, provided the manifold 10 is not rigidly fixed to the backing plate 11, allows room for expansion, contraction, and displacement of the backing plate 11 while placing relatively little stress on the connections between the manifolds 10.

As further shown in FIG. 5A, O-rings 13 are disposed between the neck 6 and the lower diffuser plate 7. The lower diffuser plate is in turn sealed, relative to the housing 20, via housing O-rings 14.

The manifold 10, backing plate 11, and lower diffuser nozzle 7 are typically made from carbon steel or stainless steel, but other materials may be used. Similarly, the vessel 20 is typically made from some form of steel alloy such as stainless steel or another material capable of containing pressurized fluid. In some embodiments, the backing plate 11 is connected to a second backing plate disposed on a top side of the vessel 20 via tie rods (not shown). However, other forms of connection between the backing plate 11 and vessel 20 may be used. As further shown in FIG. 5A, the adsorptive material 120 is disposed on top of the perforated plate 41. However, other arrangements may be used where the adsorbent material is supported differently.

Figure 5B:
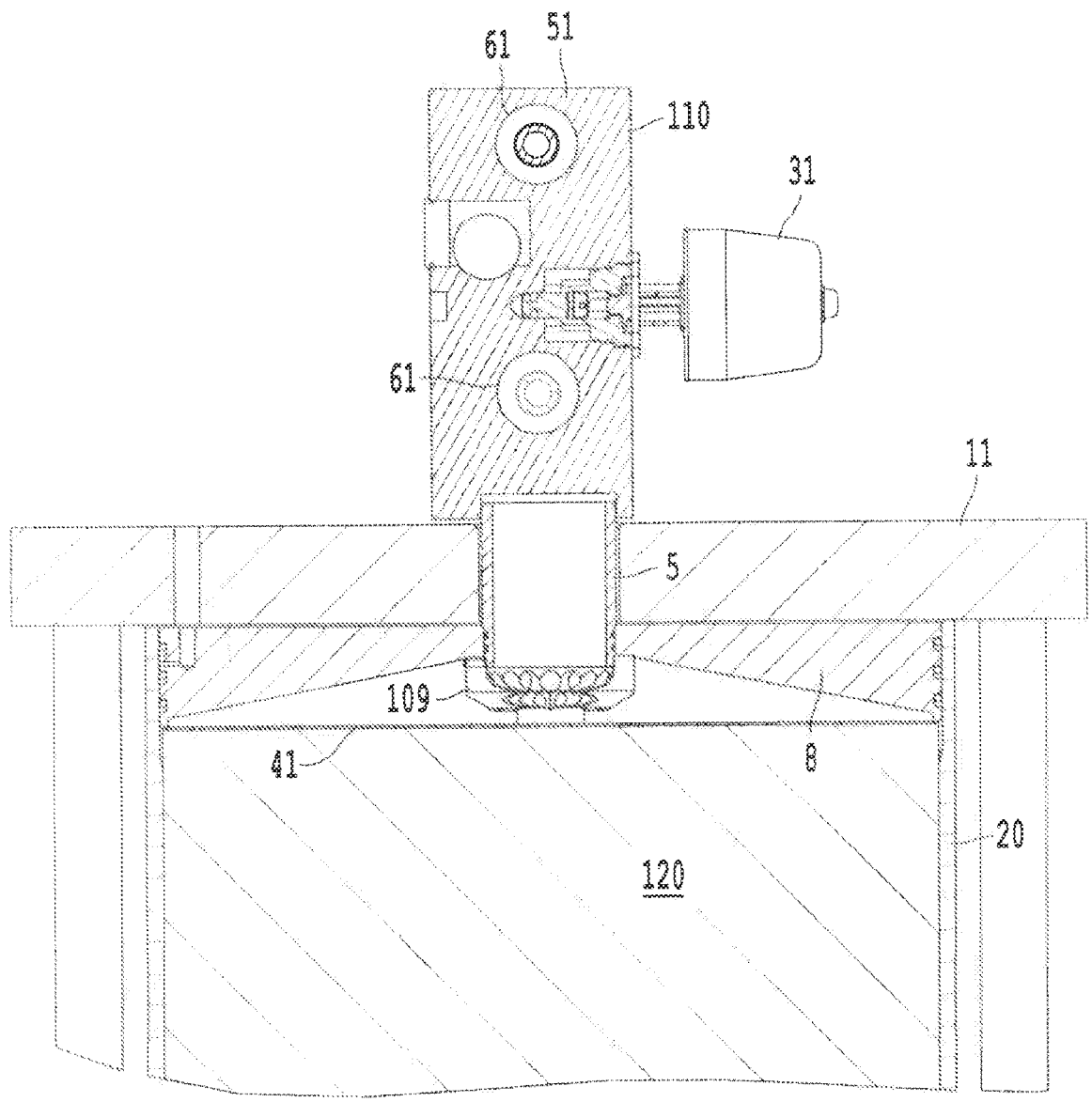
FIG. 5B is a detailed section view of a top portion of a PSA vessel with a manifold attached.

FIG. 5B shows an upper manifold 110 with a valve 31 disposed on top of a second backing plate 11. An upper diffuser nozzle 8 serves as a counterpart to the lower diffuser nozzle 7 shown in FIG. 5A. A second sparger 109 is disposed above a perforated plate 41 above the adsorptive material 120. In FIG. 5B, glands are shown encircling a periphery of the upper diffuser nozzle 8. These glands will typically receive one or more housing O-rings such as the housing O-rings 14 shown in FIG. 5A. FIG. 5B also shows a plenum cavity 51 in fluid communication with two channels 71 inside the upper valve manifold 110. FIG. 5A also shows a similar plenum cavity 51. The plenum cavities 51 are in fluid communication with the inside of the vessel 20 via the stem 5 and neck 6, respectively.

As is evident from FIGS. 4, 5A, and 5B, the manifold 10 and second manifold 110 are at least partially isolated from axial movement (up and down in FIGS. 4, 5A, and 5B) of the respective backing plates 11. This is so because the stem and neck are allowed to slide, via their respective O-ring seals, relative to the nozzle plates 7 and 8. Additionally, the nozzle plates 7 and 8 can slide relative to the housing 20 via their respective O-ring seals. As discussed previously, one benefit of this arrangement is that the manifolds 10 and 110 transmit relatively little displacement of the backing plates to the plumbing connecting these manifolds such as the plumbing 32 shown in FIG. 1B. Therefore, the plumbing connecting the manifolds has less risk of cracking and leaking than conventional PSA arrangements do. Thus, the above-noted arrangement provides a convenient method and apparatus for carrying a reduced moment load due to dimensional changes in the pressure vessel 20.

Figure 12:
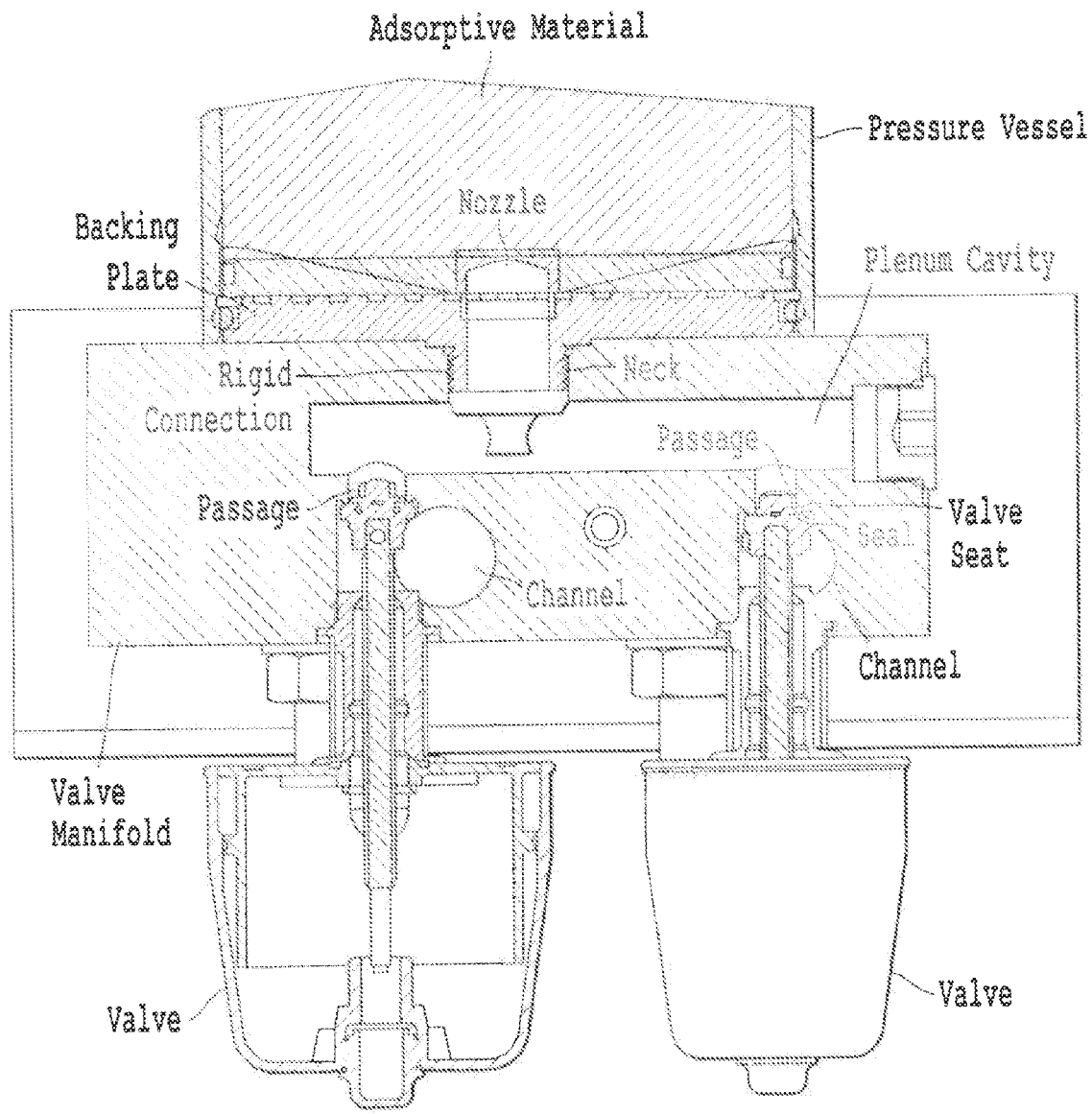
FIG. 12 is a background figure showing a conventional pressure vessel connected to a manifold incorporating two valves.

In contrast, the arrangement of the end pieces in the conventional device shown in FIG. 12 rigidly connects the valve manifold to the respective backing plate. This arrangement can cause axial displacement of the valve manifold in response to displacement of the backing plate, and therefore, can cause potential cracking or leaking in the plumbing connecting the various valve manifolds.

A second aspect of this disclosure relates to details of the manifold 10 (and 11 in certain cases). As discussed above, in conventional manifolds, a portion of the valve manifold itself would serve as a seat that would seal against a seal or gasket disposed on the valve connected to the valve manifold. At times, a surface of the seat would become scratched or marred and would be difficult to repair inasmuch as this seat was internal to the valve manifold and was not removable.

Figure 6A:
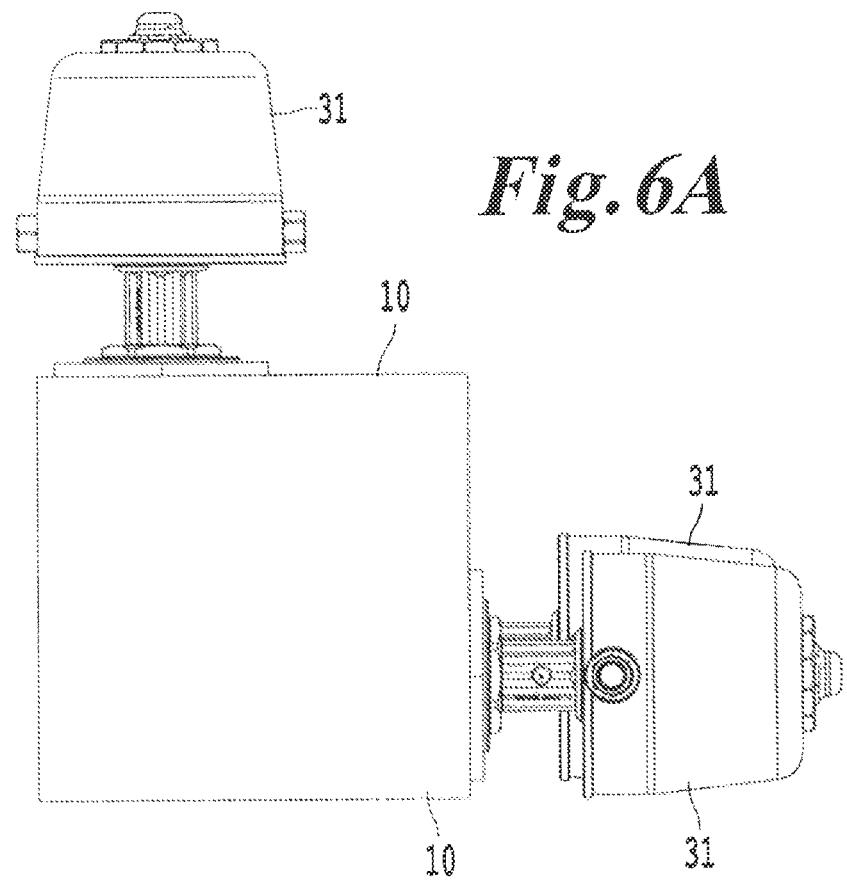
FIG. 6A is a side view of a manifold.
Figure 6B:
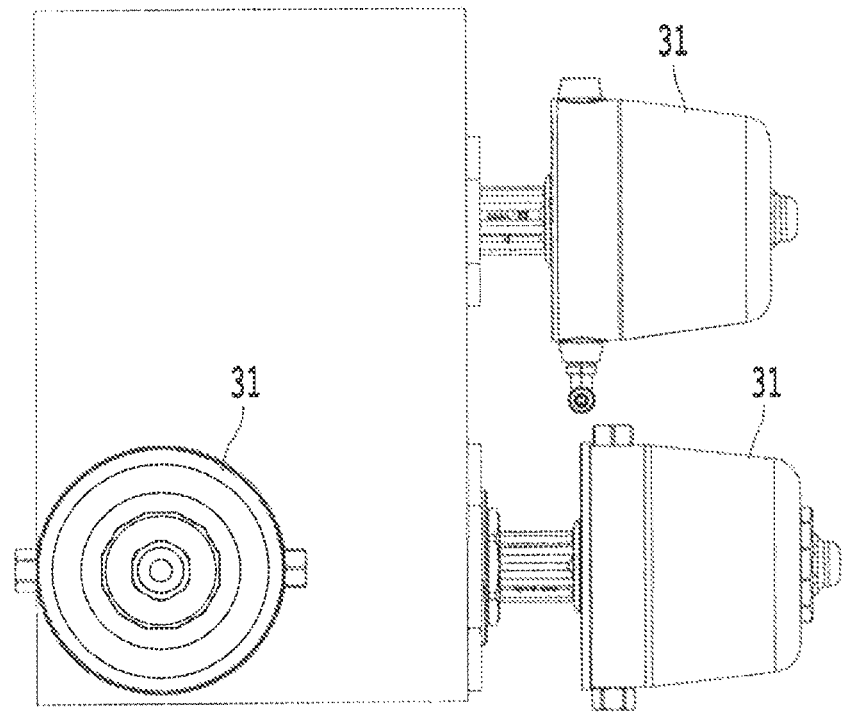
FIG. 6B is a bottom view of a manifold.
Figure 6C:
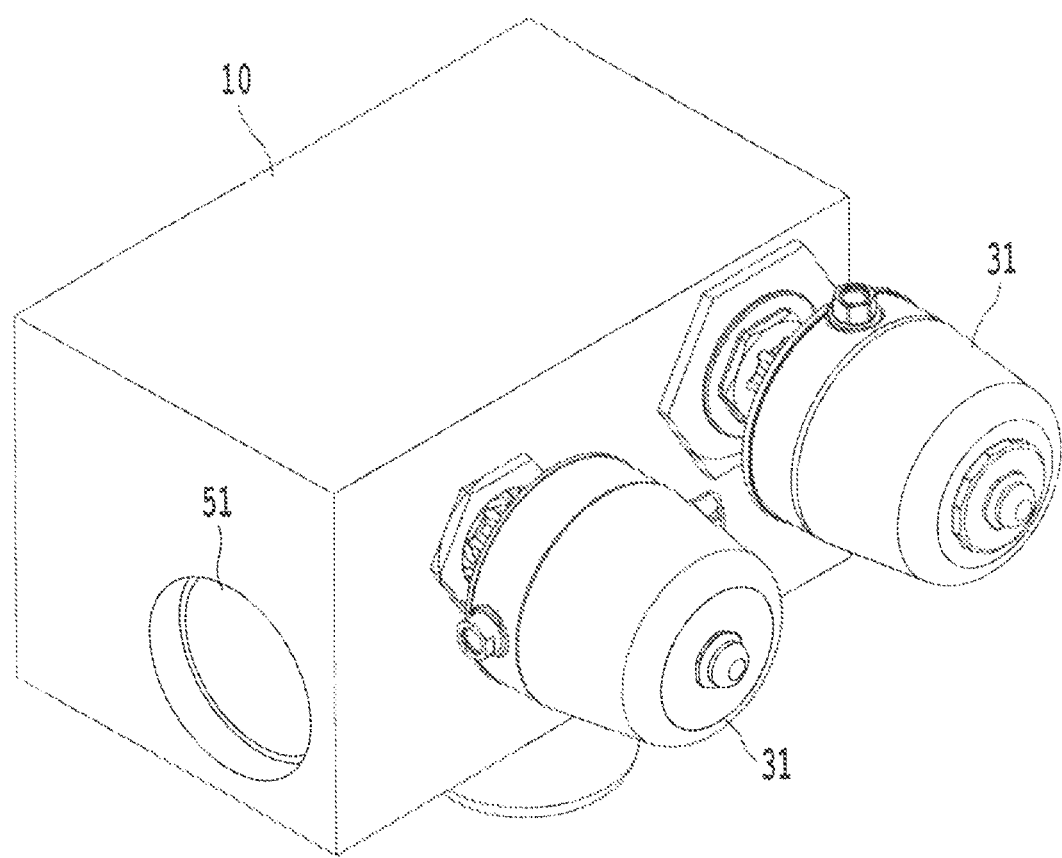
FIG. 6C is an isometric view of a valve manifold as shown in FIGS. 6A and 6B.
Figure 7A:
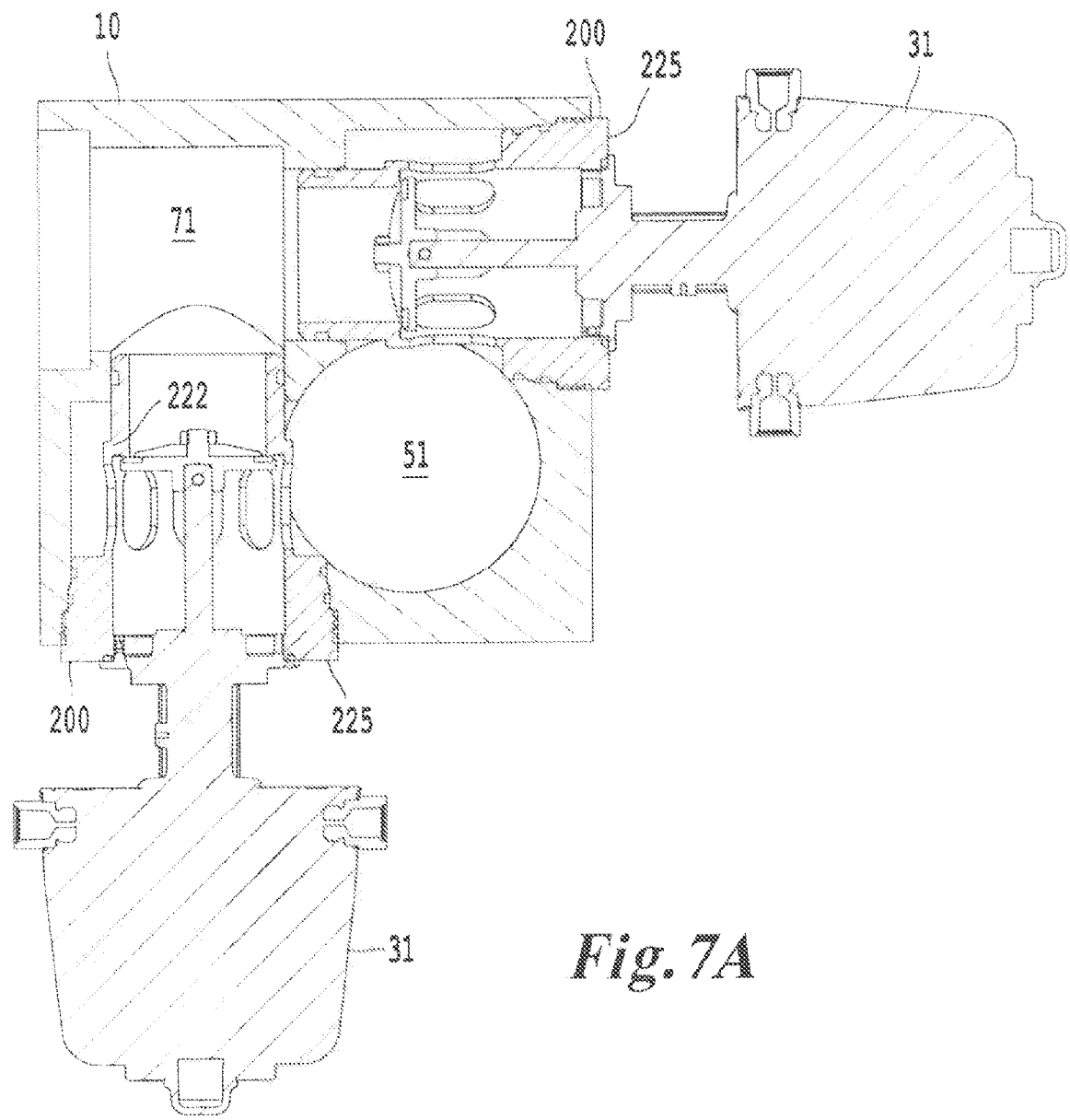
FIG. 7A is a section view of a manifold taken in side view.
Figure 7B:
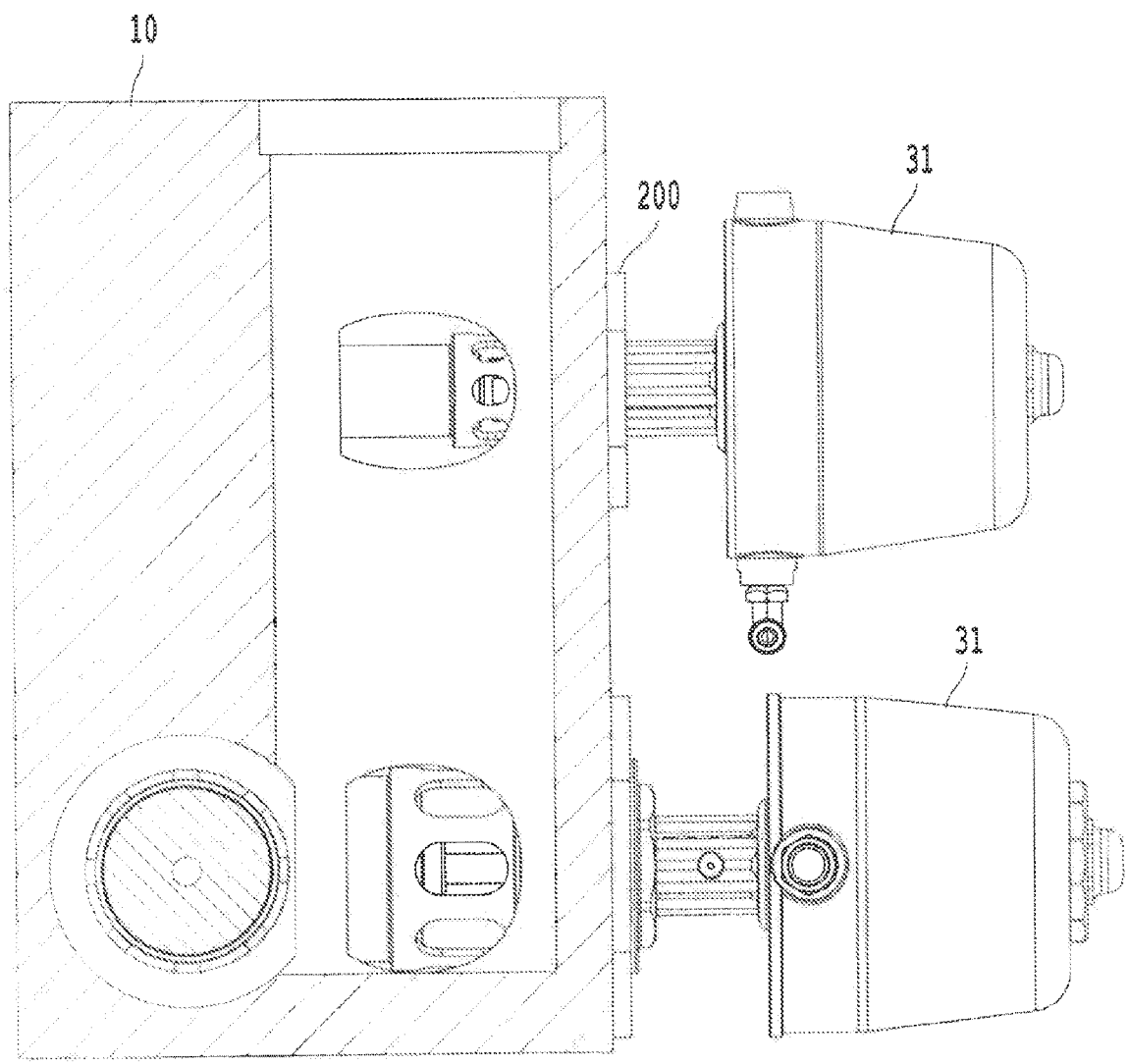
FIG. 7B is a section view of a manifold taken along a different side of the manifold.
Figure 7C:
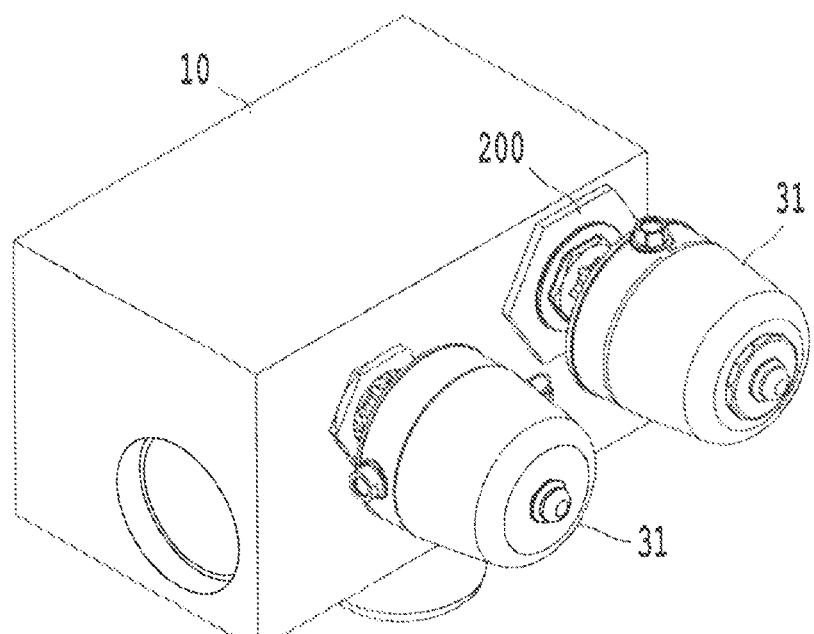
FIG. 7C is a perspective view of the manifold shown in FIGS. 7A and 7B.
Figure 7E:
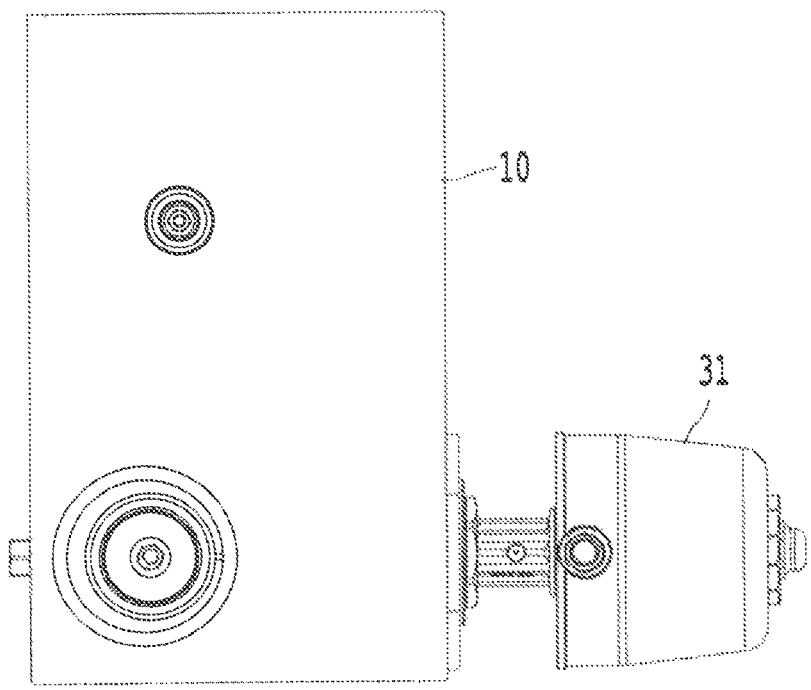
FIG. 7E is a side view of the manifold.
Figure 7D:
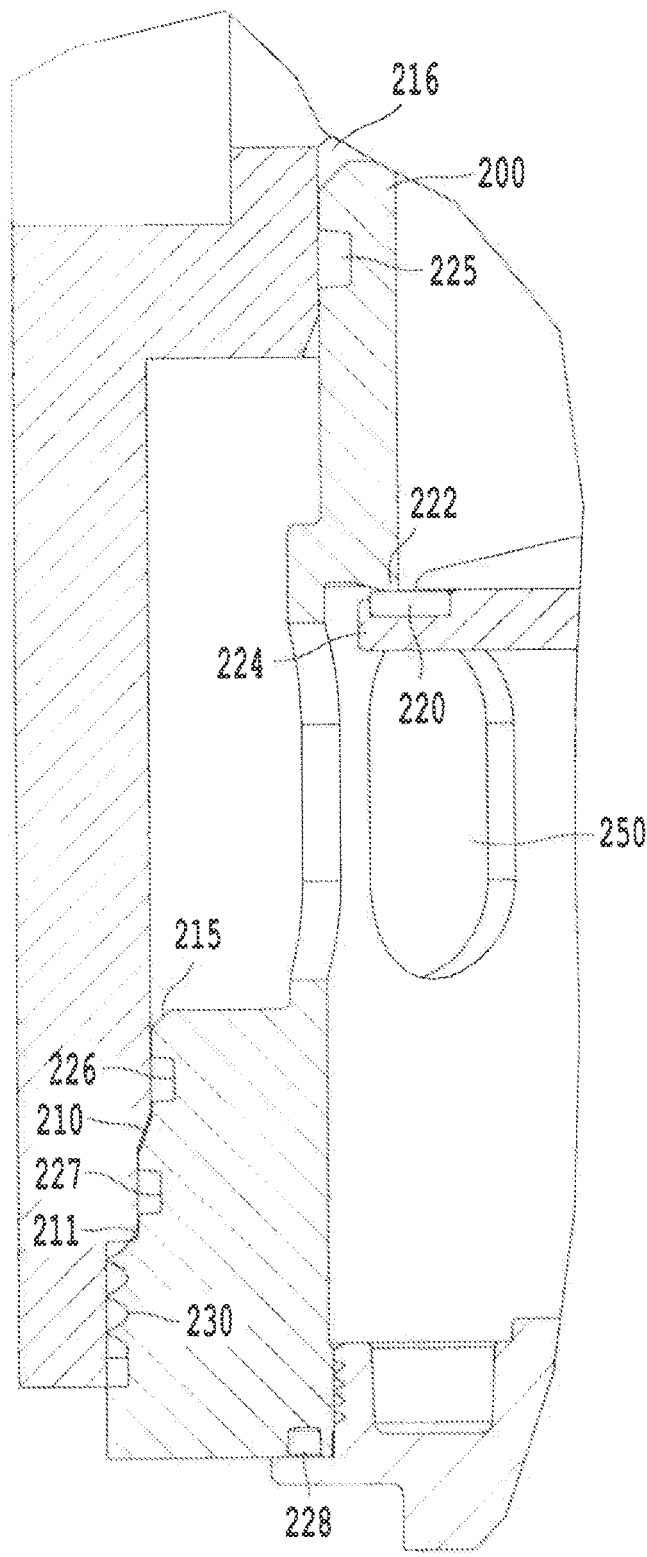
FIG. 7D is a detailed view of a portion of the manifold shown in FIG. 7A.

FIGS. 6A-6C are various views of the valve manifold 10 assembled together with automatic valves 31. The plenum cavity 51 is also shown in FIG. 6C. FIGS. 7C-7E show further details of the connection of the valves 31 to the manifold 10. FIG. 7A is a section view showing a valve 31 threaded into an insert 200, which is in turn threaded into the manifold 10. The insert 200 is typically formed, machined, or molded from carbon steel or stainless steel. However, other materials capable of supporting a valve and withstanding substantial pressure can be used. As shown in FIG. 7D, which is a detailed view from FIG. 7A, the seal 220, which is typically attached to the valve 31, abuts against a seat 222 when the valve 31 is in a closed state. As shown in FIG. 7A, the plenum cavity 51 is in fluid communication with one side of a seal assembly 224 of the valve 31. Thus, pressure from the plenum cavity 51 pushes against the backside of the seal assembly 224 and forces the seal or gasket 220 toward the seat 222. As discussed previously, for safety reasons, it is preferred that the valve 31 default to a closed position absent a positive input from a controller. For example, typical controllers may include a programmable logic controller (PLC) or computer. Such controllers typically send electrical signals to pilot valves which in turn send pneumatic, hydraulic, electrical, or other signals to the valves 31 in order to open or close these valves. If the PLC or other controller should fail, it is preferred that the valve 31 default to a "normally closed" position.

In the depicted examples, the insert 200 is threaded into the valve manifold 10. In order to protect the insert and any O-rings disposed in either the manifold or on the insert itself during insertion, the insert includes a first tapered lead-in 210, a second tapered lead-in 216, and the manifold 10 typically includes another tapered lead in, such as a third tapered lead-in 215. Thus, during insertion of the insert 200, a user will have relatively less difficulty placing the insert 200 in the manifold 10 because the insert will, in effect, find its way into the opening in the manifold 10. Various glands 225, 226, and 227 are disposed on the insert 200 and are configured to receive one or more O-rings (not shown) in order to seal the insert 200 relative to the valve manifold 10. In an alternate embodiment, the glands 225, 226, 227 can be placed on the valve manifold 10 itself. Furthermore, one or more of the glands may be placed on the valve manifold while one or more other glands may be placed on the insert, depending on the preference of the user. However, it is typically preferred that the glands be placed on the insert 200 itself inasmuch as it is often easier to place an O-ring around a male portion than it is to place an O-ring in a gland within a port.

As described above, the insert 200 is removable and is typically threaded into the manifold 10. However, other methods of attaching the insert 200 to the valve manifold 10 are available. For example, the insert can be connected to the valve manifold 10 via a snap ring, bolt connection, clamp, or other such connection.

Figure 8C:
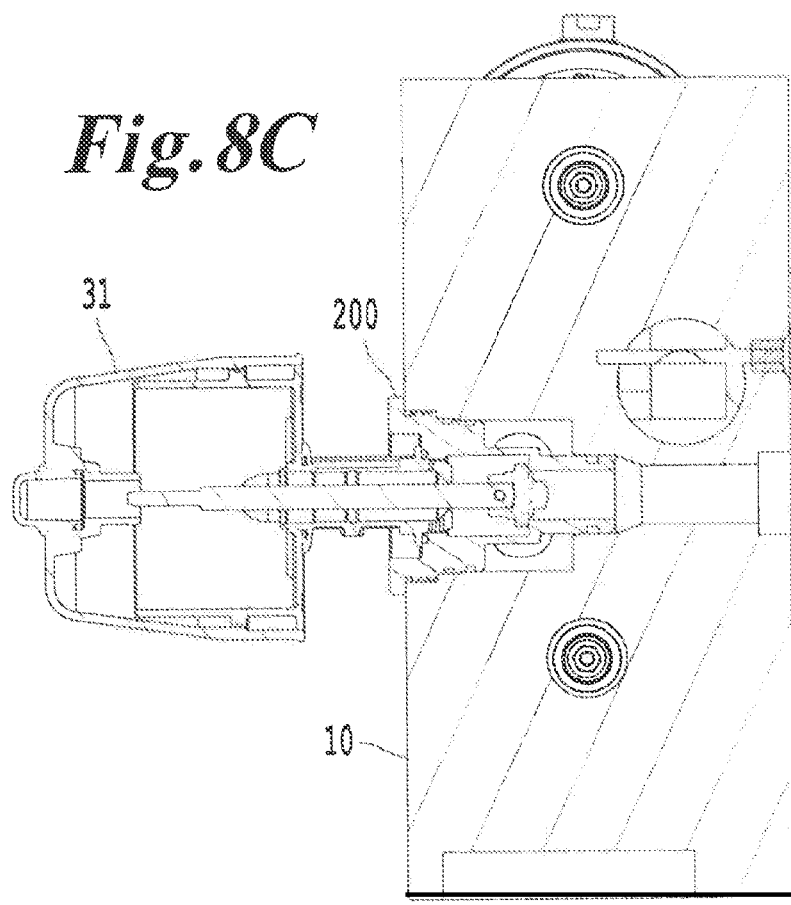
Figure 8D:
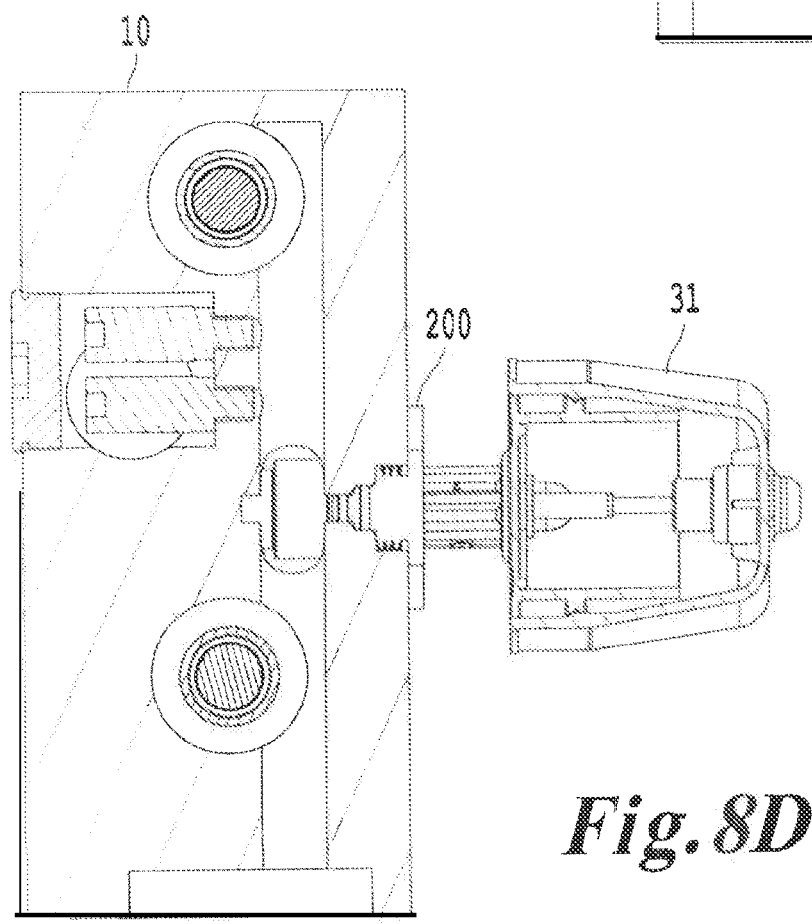
Figure 8E:
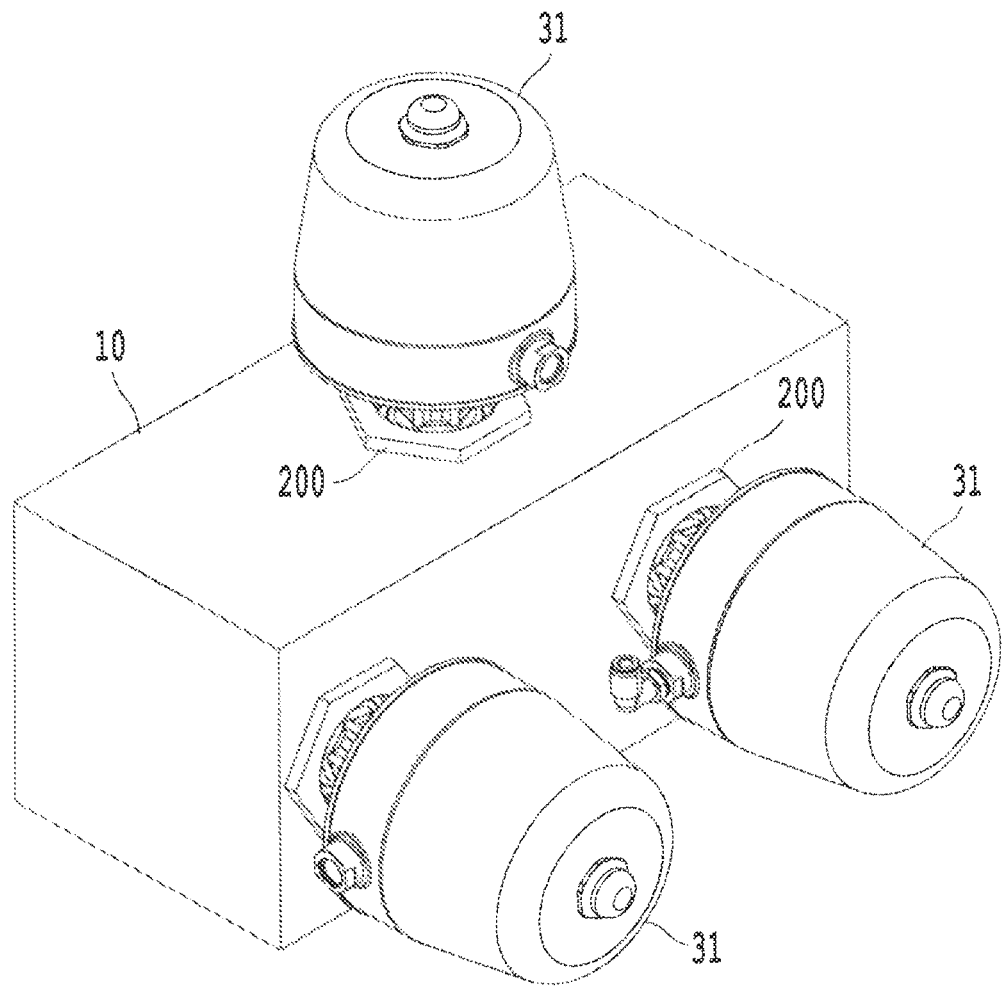
FIG. 8E is a perspective view of the manifold shown in FIG. 8A.
Figure 9A:
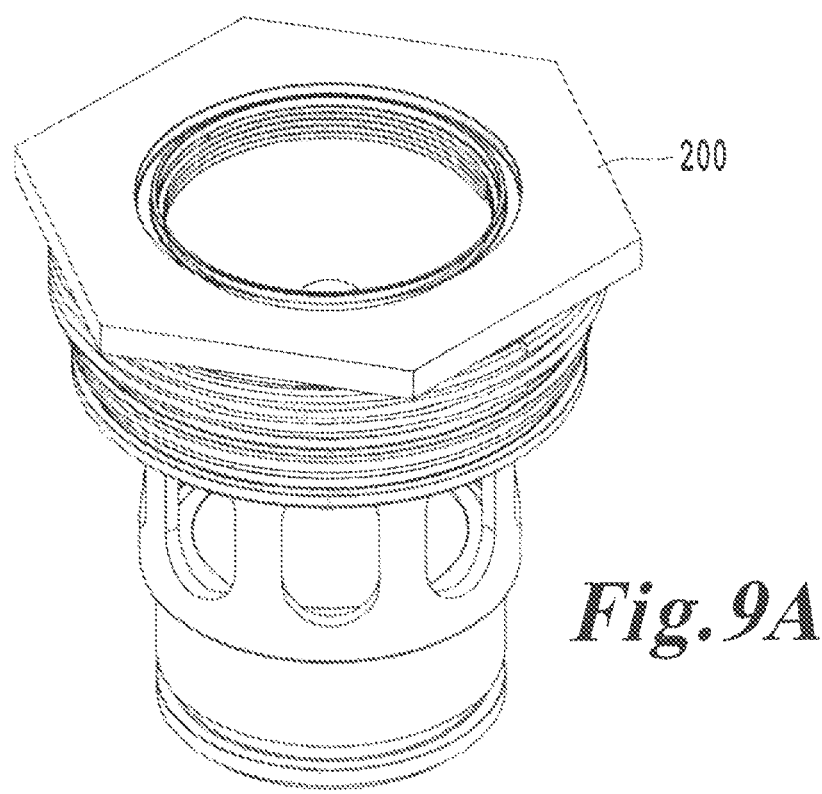
FIG. 9A is a perspective view of an insert according to one embodiment of the present invention.
Figure 9B:
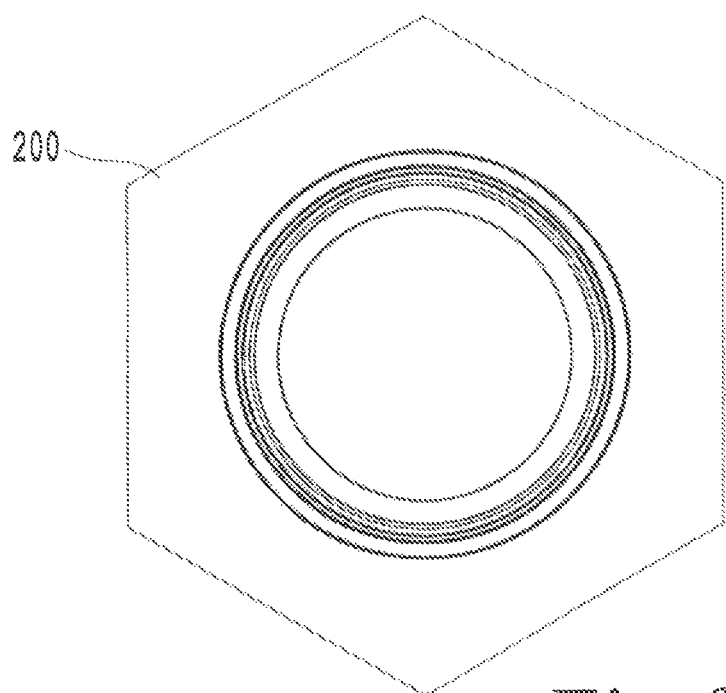
FIGS. 9B-9D are top, section, and side views of the insert shown in FIG. 9A.
Figure 9C:
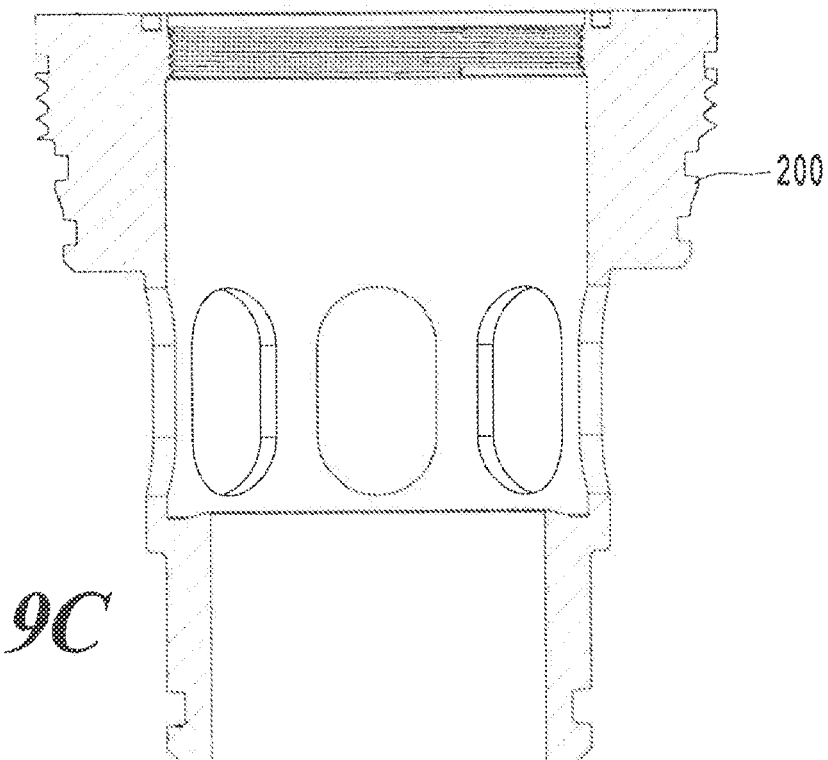
Figure 9D:
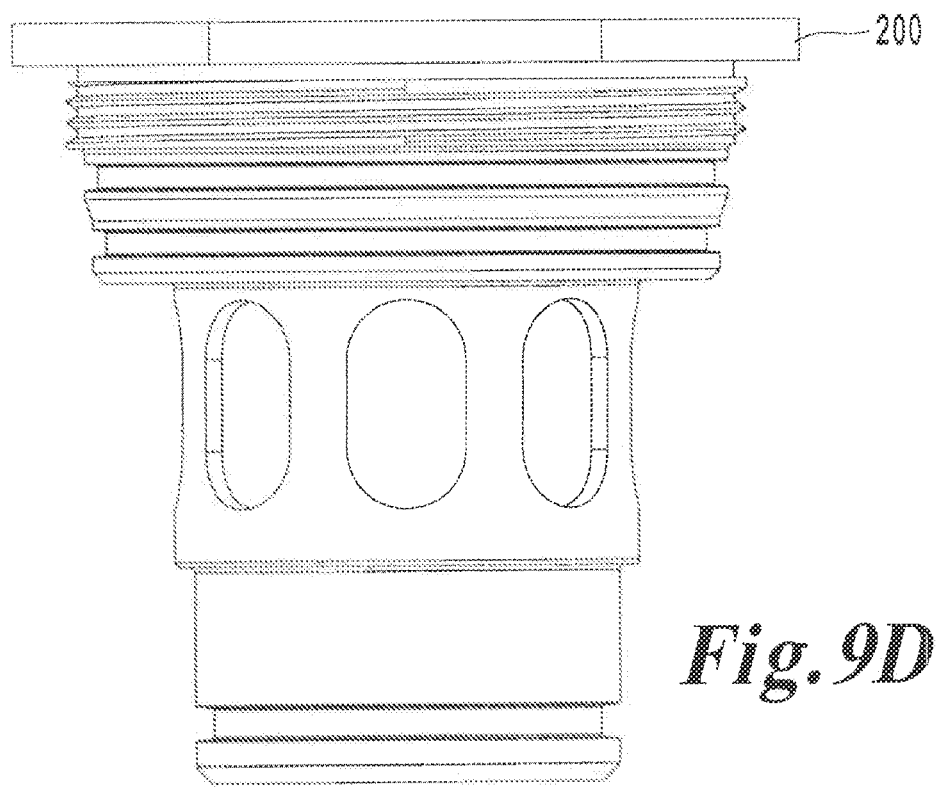
Figure 9E:
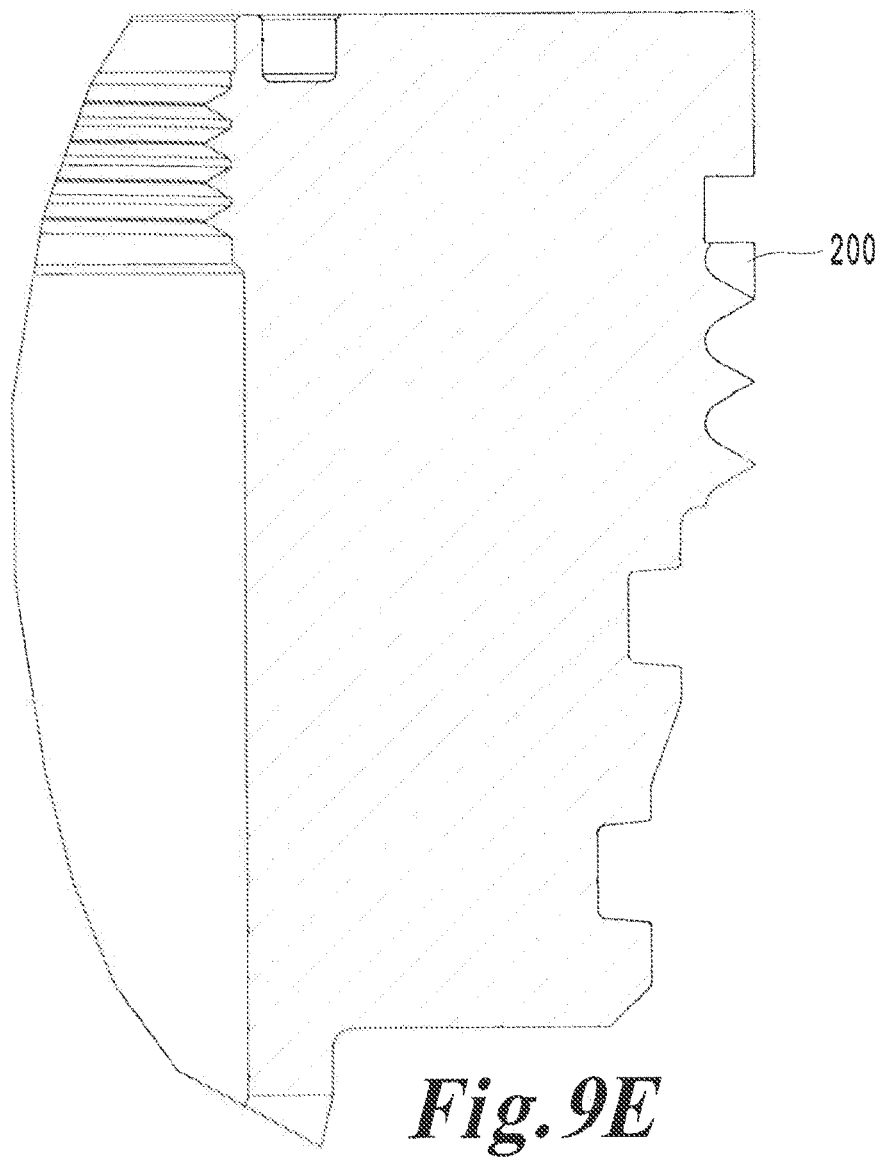
FIGS. 9E-9G are detailed views of the insert shown in FIG. 9A.
Figure 9F:
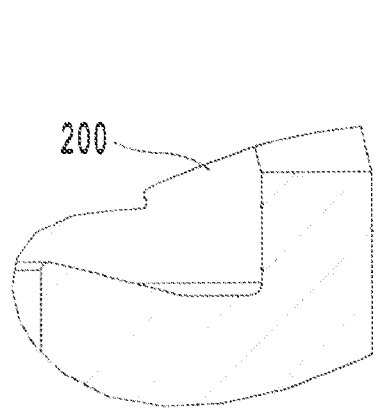
Figure 9G:
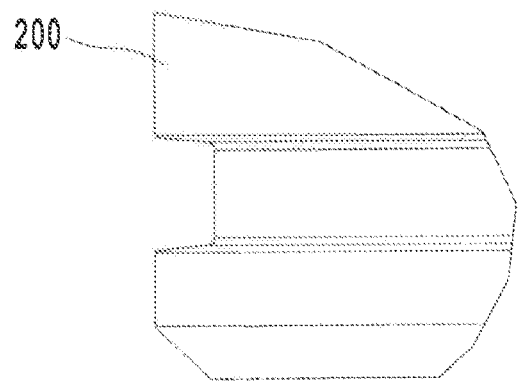
Figure 10A:
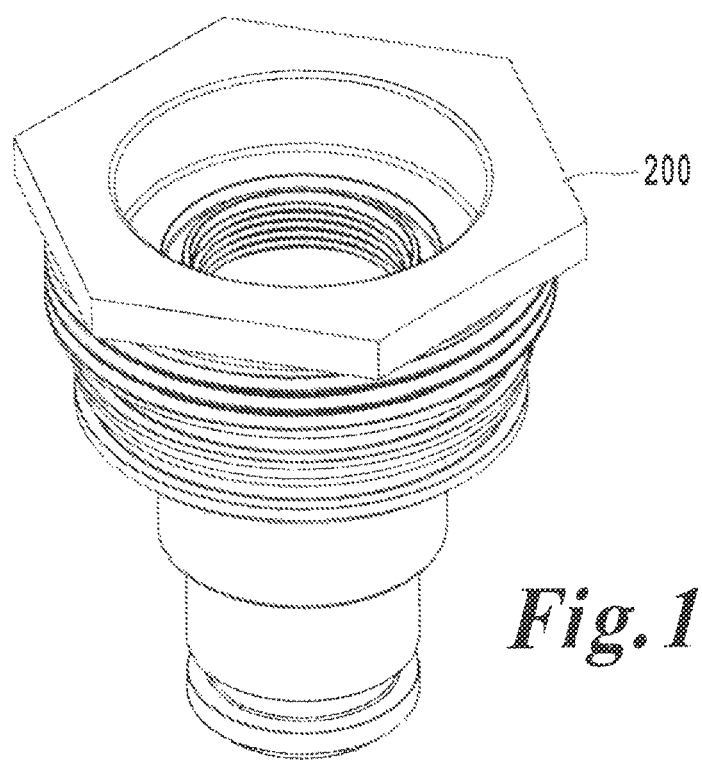
Figure 10B:
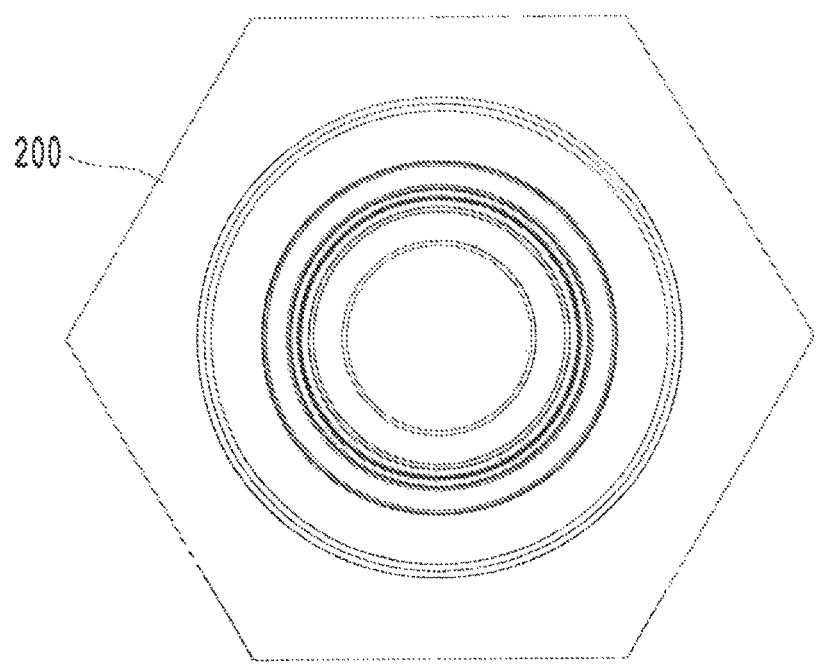
Figure 10C:
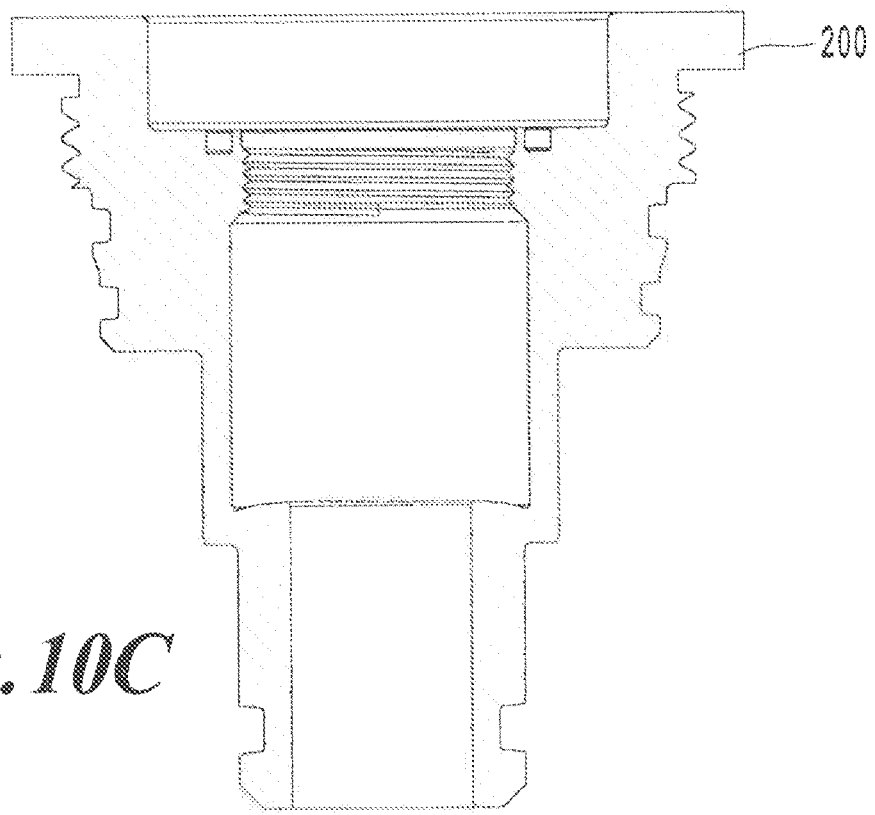
Figure 10D:
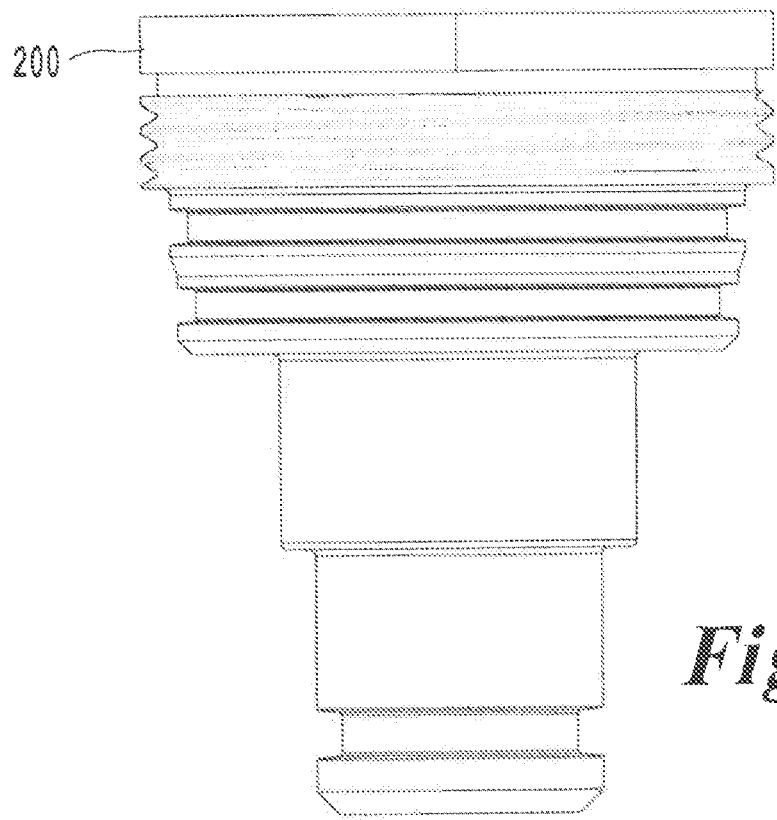
Figure 11A:
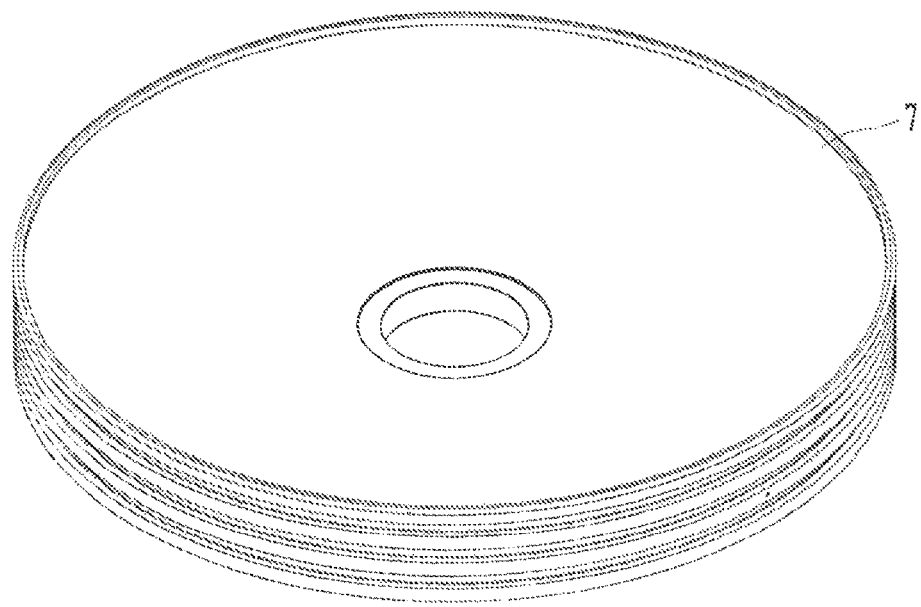
FIG. 11A is an isometric view of a diffuser according to one aspect of the present invention.
Figure 11B:
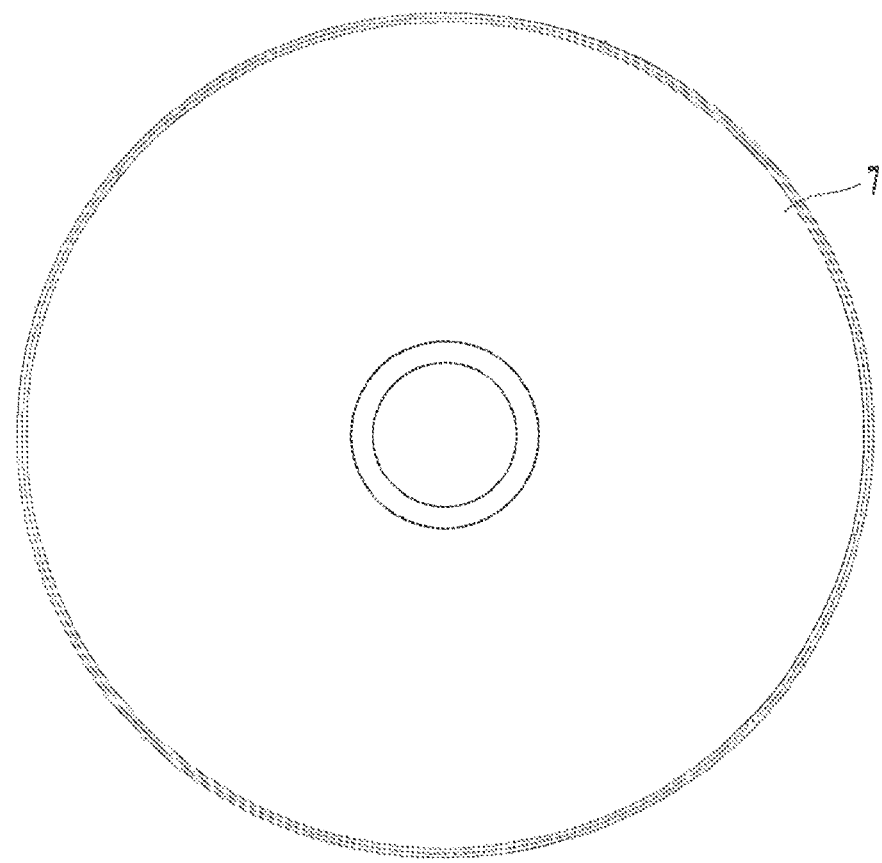
FIG. 11B is a top view of the diffuser shown in FIG. 11A.
Figure 11C:
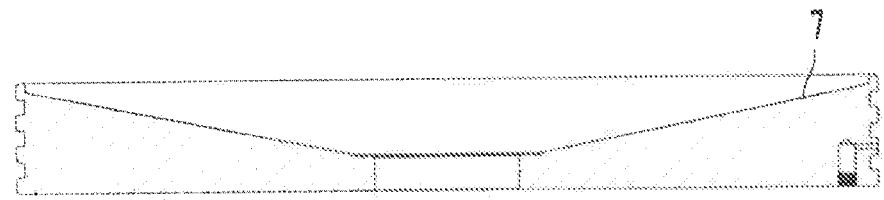
FIG. 11C is a section view of the diffuser shown in FIG. 11A.
Figure 11D:
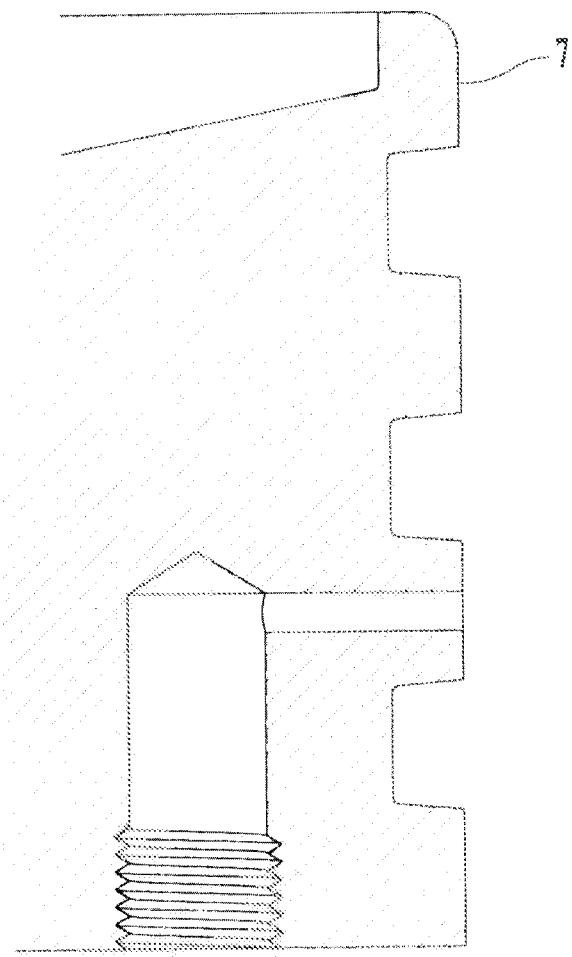
FIG. 11D is a detailed view of a portion of the diffuser shown in FIG. 11C.

FIGS. 8A-8E show another example of the insert 200 placed within a valve manifold 10. FIGS. 8B and 8C show the valve 31 in a closed position with the seal of the valve placed in contact with the seat of the insert.

One benefit of the above-noted arrangement is that the insert, being removable from the manifold 10, can be replaced without discarding or repairing the entire manifold 10. In other words, the seat 222 can be removed from the manifold 10. Therefore, repair of the seat 222 or replacement of the seat 222 is much easier than when the seat 222 is an integral part of the valve manifold 10 itself. FIGS. 9A-10G show various views, including section views, of the insert 200. As shown in FIGS. 9A-10D, the insert 200 may include a hexagonal portion for facilitating threading of the insert into the manifold 10. Thus, the insert can act as a bolt inasmuch as threading the insert 200 into the manifold 10 causes the insert 200 to move axially into the manifold 10. This axial motion assists the user in overcoming the resistance any O-rings displaced on the insert 200 or inside the valve manifold 10 may create when the insert 200 is placed within the valve manifold 10.

FIGS. 11A-11D show various views of a diffuser nozzle such as the diffuser nozzles 7 and 8 shown in FIG. 3A.

As shown in FIG. 7A, the plenum cavity 51 is in fluid communication with a backside of the seal assembly 224 of the valve 31. Thus, as the seat 222 makes contact with the seal or gasket 220 on an opposite side of the seal assembly 224 from the side on which pressure from the plenum cavity 51 exerts force on the seal assembly 224, pressure from the cavity 51 assists the valve 31 in closing. This is so because, when a relative difference in pressure occurs across the seal assembly 224, the seal assembly will tend to move toward the area of lower pressure. As discussed previously, the plenum cavity 51 is in fluid communication with an interior of the vessel 20. Thus, when the pressure within the pressure 20 is greater than the pressure in the channel 71, the valves 31 will be assisted in closing the passage 61 by the pressure within the vessel, which is the same as the pressure inside the plenum cavity 51. Thus, to create a "normally closed" valve 31 in this arrangement, a less stiff biasing member, such as a relatively weak spring, may be used inside the valve 31 in order to push the seal assembly portion 224 toward the seat 222.

While the above-noted description associates the seat 222 with the insert 220, certain embodiments of the insert provide a seal on the insert 200 and place the seat on the valve. In other words, the seat and the seal or gasket are reversed in position.

Although only certain embodiments of this invention have been described in detail above, those skilled in the art will readily appreciate that many modifications are possible in the exemplary embodiment without materially departing from the novel teachings and advantages of this invention. Accordingly, all such modifications are intended to be included within the scope of this invention.

The invention claimed is:

1. A pressure swing adsorption system comprising:
a pressure vessel;
a nozzle plate coupled to the vessel and sealed with respect to the pressure vessel;
a backing plate that supports the nozzle plate; and
a manifold including a plenum cavity and coupled to the nozzle plate via a neck such that the plenum cavity is in fluid communication with an interior of the pressure vessel,
wherein the neck is sealed with respect to the nozzle plate via a movable sealing surface.

2. The pressure swing adsorption system according to claim 1, wherein the movable sealing surface comprises at least one radial seal.

3. The pressure swing adsorption system according to claim 2, wherein the radial seal comprises at least one lip seal.

4. The pressure swing adsorption system according to claim 2, wherein the radial seal comprises at least one cup seal.

5. The pressure swing adsorption system according to claim 2, wherein the radial seal comprises at least one O-ring.

6. The pressure swing adsorption system according to claim 5, wherein the O-ring is disposed at least partially within a gland on the nozzle plate.

7. The pressure swing adsorption system according to claim 1, further comprising a gap disposed between the manifold and the backing plate and bridged by the neck such that a displacement of the backing plate along a longitudinal axis of the pressure vessel affects the length of the gap.

8. The pressure swing adsorption system according to claim 7, wherein the displacement of the backing plate does not result in displacement of the manifold.

9. The pressure swing adsorption system according to claim 1, wherein the manifold includes at least one channel configured to connect in fluid communication with the plenum cavity via at least one passage, and at least one valve is coupled to the manifold and configured to open and close the passage.

10. The pressure swing adsorption system according to claim 9, wherein the at least one valve is coupled to the manifold via at least one removable insert.

11. The pressure swing adsorption system according to claim 10, wherein the at least one removable insert is disposed between the valve and manifold and includes a surface configured to abut a movable portion of the valve.

12. The pressure swing adsorption system according to claim 11, wherein the surface is a valve seat, and the movable portion of the valve is a seal.

13. The pressure swing adsorption system according to claim 11, wherein the seal comprises a polymer.

14. The pressure swing adsorption system according to claim 13, wherein the polymer comprises a fluoropolymer.

15. The pressure swing adsorption system according to claim 14, wherein the fluoropolymer comprises polytetrafluoroethylene.

16. The pressure swing adsorption system according to claim 9, wherein the channel is coupled in fluid communication with at least a second manifold via fluid connectors.

17. The pressure swing adsorption system according to claim 16, wherein the fluid connectors are rigid pipes.

18. The pressure swing adsorption system according to claim 1, wherein the neck is welded to the manifold.

19. The pressure swing adsorption system according to claim 1, wherein the nozzle plate is sealed with respect to the vessel via at least one radial seal.

20. The pressure swing adsorption system according to claim 19, wherein the at least one radial seal comprises at least one cup seal.

21. The pressure swing adsorption system according to claim 19, wherein the at least one radial seal comprises at least one lip seal.

22. The pressure swing adsorption system according to claim 19, wherein the at least one radial seal comprises at least one O-ring.

23. The pressure swing adsorption system according to claim 22, wherein the at least one O-ring is at least partially disposed in at least one gland on the nozzle plate.

24. A pressure swing adsorption system comprising:
a pressure vessel;
a nozzle plate coupled to the vessel and sealed with respect to the pressure vessel;
a backing plate that supports the nozzle plate; and
a manifold including a plenum cavity and coupled to the nozzle plate via a neck such that the plenum cavity is in fluid communication with an interior of the pressure vessel; the manifold including
at least one valve configured to open and close a passage in the manifold such that the plenum cavity is in fluid communication with, and blocked from fluid communication with, respectively, a channel in the manifold, and
a removable insert that couples the valve to the manifold and includes a first surface configured to abut a movable second surface disposed on the valve.

25. The pressure swing adsorption system according to claim 24, wherein the removable insert is coupled to the manifold via a first threaded connection.

26. The pressure swing adsorption system according to claim 25, wherein the valve is coupled to the removable insert via a second threaded connection.

27. The pressure swing adsorption system according to claim 24, wherein the first surface is a valve seat comprising a first material, and the second surface is seal comprising a second material different from the first material.

28. The pressure swing adsorption system according to claim 27, wherein the second material is softer than the first material.

29. The pressure swing adsorption system according to claim 28, wherein the second material comprises a polymer.

30. The pressure swing adsorption system according to claim 29, wherein the polymer is a fluoropolymer.

31. The pressure swing adsorption system according to claim 27, wherein the first material is a metal.

32. A method of performing pressure swing adsorption comprising:
providing a pressure vessel;
providing a valve manifold including
at least one plenum cavity connected, in fluid communication, to an opening of the vessel such that the plenum cavity is in fluid communication with an interior of the vessel,
a channel,
a passage connecting, in fluid communication, the channel to the cavity;
connecting a valve to the passage, the valve being configured to selectively permit and restrict flow between the channel and the cavity via the passage, a seal assembly of the valve including a first surface and a second surface opposite the first surface such that, when the valve restricts flow between the channel and the cavity, the first surface is disposed in direct contact with a seating surface disposed inside the valve manifold,
urging the first surface toward the seating surface by applying a pressure to the plenum cavity greater than a pressure applied to the channel.

33. The method according to claim 32, wherein the valve manifold comprises at least one additional valve configured to control fluid flow from the cavity to a channel connected to another vessel.

34. The method according to claim 32, further comprising providing an adsorptive material inside the vessel.

35. The method according to claim 34, further comprising performing pressure swing with the adsorptive material and the manifold.

36. The method according to claim 32, further comprising coupling to the valve manifold a removable insert that includes the seating surface.

37. The method according to claim 36, further comprising coupling the removable insert to the valve manifold via threading.

38. The method according to claim 36, further comprising coupling the removable insert to the valve via threading.

* * * * *